US011554724B2

(12) United States Patent
Owen et al.

(10) Patent No.: US 11,554,724 B2
(45) Date of Patent: Jan. 17, 2023

(54) BICYCLE RACK WITH C-HOOPS

(71) Applicant: EAST MOUNTAIN OUTFITTERS LLC, Alpine, UT (US)

(72) Inventors: Charles Blake Owen, Alpine, UT (US); Bryce Allen Owen, Highland, UT (US)

(73) Assignee: EAST MOUNTAIN OUTFITTERS LLC, Alpine, UT (US)

( * ) Notice: Subject to any disclaimer, the term of this patent is extended or adjusted under 35 U.S.C. 154(b) by 0 days.

(21) Appl. No.: 17/339,562

(22) Filed: Jun. 4, 2021

(65) Prior Publication Data

US 2021/0291745 A1 Sep. 23, 2021

Related U.S. Application Data

(63) Continuation of application No. 17/003,094, filed on Aug. 26, 2020, which is a continuation-in-part of
(Continued)

(51) Int. Cl.
*B60R 9/10* (2006.01)
*B60R 9/06* (2006.01)
*B62H 3/12* (2006.01)

(52) U.S. Cl.
CPC ............... *B60R 9/10* (2013.01); *B60R 9/06* (2013.01); *B62H 3/12* (2013.01)

(58) Field of Classification Search
CPC ..... B60R 9/10; B60R 9/06; B60R 2011/0061; B60R 2011/0071; B62H 3/12; B62H 3/08
See application file for complete search history.

(56) References Cited

U.S. PATENT DOCUMENTS 5,190,195 A 3/1993 Fullhart et al.
D341,348 S * 11/1993 Williams .................... D12/408
(Continued)

FOREIGN PATENT DOCUMENTS

WO WO 2003/064214 A1 8/2003
WO WO 2017/001224 A1 1/2017

OTHER PUBLICATIONS

PCT International Search Report and Written Opinion dated Dec. 5, 2019, for PCT International Patent Application No. PCT/US2019/044865 filed Aug. 2, 2019, 12 pages.
(Continued)

*Primary Examiner* — Brian D Nash
(74) *Attorney, Agent, or Firm* — Launchpad Intellectual Property, Inc.; Christopher A. Wiklof

(57) ABSTRACT

A hitch mounted bicycle carrier that vertically mounts a plurality of bicycles. The bicycles are secured by the front tire in a C-hoop structure at the top of the bicycle carrier. The bicycle carrier secures a rear tire to a lower mounting structure. The bicycle carrier is configured to be mounted to the vehicle with an anti-rattle hitch mounting method. A hinge structures integrates dampers/gas springs to slow the hinging of the bicycle carrier when loaded with bicycles. The bicycle carrier when not in use for transportation doubles as a bicycle storage and access rack. The bicycle carrier also acts as a bicycle tuning, repair, and workstation when on the back of a vehicle or when in use as a storage access rack. The bicycle carrier also features integrated locking cables as an anti-theft deterrent when riders aren't with the bicycles and bicycle carrier.

18 Claims, 24 Drawing Sheets

Related U.S. Application Data application No. PCT/US2019/044865, filed on Aug. 2, 2019.

(60) Provisional application No. 62/715,203, filed on Aug. 6, 2018, provisional application No. 62/841,933, filed on May 2, 2019.

(56) References Cited

U.S. PATENT DOCUMENTS

| | | | | |
|---|---|---|---|---|
| 5,526,971 | A * | 6/1996 | Despain | B60R 9/06 |
| | | | | 224/519 |
| 5,579,972 | A * | 12/1996 | Despain | B60R 9/10 |
| | | | | 224/506 |
| 6,062,451 | A | 5/2000 | Lassanske et al. | |
| 6,460,745 | B1 * | 10/2002 | Weaver | B60R 9/06 |
| | | | | 211/17 |
| 9,321,407 | B2 * | 4/2016 | Loken | B60R 9/06 |
| 9,376,063 | B2 * | 6/2016 | Hein | B60R 9/06 |
| 10,501,023 | B1 * | 12/2019 | Mayers | B60R 9/06 |
| 2001/0035446 | A1 * | 11/2001 | Walstrom | B60R 9/10 |
| | | | | 224/501 |
| 2003/0080169 | A1 * | 5/2003 | Munoz | B60R 9/06 |
| | | | | 224/492 |
| 2003/0089751 | A1 * | 5/2003 | Munoz | B60R 9/10 |
| | | | | 224/492 |
| 2005/0082329 | A1 * | 4/2005 | Cohen | B60R 9/10 |
| | | | | 224/519 |
| 2009/0120984 | A1 * | 5/2009 | Sautter | B60R 9/10 |
| | | | | 224/497 |
| 2010/0290876 | A1 | 11/2010 | Conatser | |
| 2011/0057008 | A1 | 3/2011 | Clausen | |
| 2011/0101060 | A1 * | 5/2011 | Hammond | B60R 9/10 |
| | | | | 224/567 |
| 2012/0048823 | A1 | 3/2012 | Kriner | |
| 2012/0168480 | A1 * | 7/2012 | Gray | B60R 9/06 |
| | | | | 224/519 |
| 2013/0101383 | A1 | 4/2013 | Lynch, Jr | |
| 2013/0142602 | A1 | 6/2013 | Barnts | |
| 2013/0309053 | A1 | 11/2013 | Cameron | |
| 2013/0327802 | A1 * | 12/2013 | Hammond | B62H 3/12 |
| | | | | 224/519 |
| 2014/0027484 | A1 * | 1/2014 | Loken | B60R 9/10 |
| | | | | 224/497 |
| 2014/0151421 | A1 * | 6/2014 | Loken | B60R 9/10 |
| | | | | 224/519 |
| 2016/0107559 | A1 | 4/2016 | Russo | |
| 2016/0129847 | A1 | 5/2016 | Mehlen | |
| 2016/0346141 | A1 | 12/2016 | Guertler | |
| 2018/0354427 | A1 * | 12/2018 | Yazdian | A45F 3/24 |
| 2019/0009730 | A1 | 1/2019 | Hintz | |
| 2019/0016271 | A1 * | 1/2019 | Garceau | B60R 9/06 |
| 2019/0161022 | A1 * | 5/2019 | McFadden | B60R 9/10 |
| 2020/0189481 | A1 | 6/2020 | Doelitsch | |
| 2020/0346505 | A1 | 11/2020 | Loewen | |
| 2020/0406830 | A1 * | 12/2020 | Owen | B60R 9/10 |
| 2021/0107580 | A1 * | 4/2021 | Flynn | B62H 3/08 |

OTHER PUBLICATIONS

"ALTA Racks" (Aug. 6, 2017; retrieved on Sep. 30, 2019), retrieved from the Internet at: https://www.instagram.eom/p/BXdA77lhUYi/.
PCT International Preliminary Report on Patentability dated Feb. 9, 2021, for PCT International Patent Application No. PCT/US2019/044865 filed Aug. 2, 2019, 8 pages.

* cited by examiner

BICYCLE RACK WITH C-HOOPS

CROSS-REFERENCE TO RELATED APPLICATIONS

The present application is a U.S. Continuation Application which claims priority benefit under 35 U.S.C. § 120 of co-pending U.S. application Ser. No. 17/003,094, entitled "BICYCLE CARRIER AND BICYCLE STORAGE RACK," filed Aug. 26, 2020. U.S. application Ser. No. 17/003,094 is a U.S. Continuation-in-Part Application which claims priority benefit under 35 U.S.C. § 120 of co-pending International Patent Application No. PCT/US2019/044865, entitled "BICYCLE CARRIER AND BICYCLE STORAGE RACK," filed Aug. 2, 2019. International Patent Application No. PCT/US2019/044865 claims priority benefit from U.S. Provisional Patent Application No. 62/715,203, entitled "BICYCLE CARRIER AND BICYCLE STORAGE RACK," filed Aug. 6, 2018. International Patent Application No. PCT/US2019/044865 also claims priority benefit from U.S. Provisional Patent Application No. 62/841,933, entitled "BICYCLE CARRIER AND BICYCLE STORAGE RACK," filed May 2, 2019. Each of the foregoing applications, to the extent not inconsistent with the disclosure herein, is incorporated by reference.

SUMMARY

In an embodiment, a sports rack for a vehicle includes a hitch bar configured to mount to a vehicle trailer hitch receiver, a hinge assembly operatively coupled to the hitch bar, and at least one post having a proximal end and a distal end. The at least one post may be operatively coupled to the hinge assembly at the proximal end, and the at least one post may be rotatable relative to the hitch bar through an arc in a vertical plane defined by the hinge assembly between a lowered position and a raised position. The sports rack may include an equipment mount operatively coupled to the distal end of the at least one post, and a damper operatively coupled to the at least one post and the hitch bar. The damper may be configured to limit a rate of rotation of the at least one post from the raised position to the lowered position.

In an embodiment, a sports equipment carrier includes a post and an equipment mount including a first support member coupled to the post and extendable substantially perpendicular to the post. In embodiments, the sports equipment carrier may be used as a bicycle carrier which includes a first C-hoop coupled to the first support member. The C-hoop is configured to receive a wheel of a bicycle such that the bicycle is suspended vertically when the wheel is in the C-hoop and the sports equipment carrier is in a raised position, ready for transport or when the sports equipment carrier is removed from a vehicle and hung from a wall or ceiling.

In an embodiment, a bicycle carrier includes a post, a first horizontal support member coupled to the post and extendable substantially perpendicular to the post, and a C-hoop for receiving a wheel of a bicycle. The C-hoop may be coupled to the first horizontal support member.

In an embodiment, a bicycle carrier includes a hitch bar configured to couple to a trailer hitch receiver of a vehicle, a post coupled to the hitch bar, and an equipment mount including a first horizontal support member coupled to the post, with a plurality of C-hoops coupled to the first horizontal support member. Each C-hoop includes a first termination and a second termination. The first and second terminations define a gap between the first and second terminations.

In an embodiment, a bicycle carrier is configured to be used to transport one or more bicycles on a vehicle or hung adjacent to a wall for bicycle storage. In an embodiment, the bicycle carrier includes a wall mount bar configured to be fastened to a wall and one or more hooks, configured to operatively couple to the wall mount bar and detachably couple to the bicycle carrier. In one embodiment, the bicycle carrier includes a hinge that allows transport, loading, and storage positions. In one embodiment, the bicycle carrier allows easy hinge usage for quick and easy bicycle loading and unloading when wall or vehicle mounted. In one embodiment, the bicycle carrier is configured to hold a plurality of bicycles. In one embodiment, the bicycle carrier allows a rear vehicle door to open even with all bicycles loaded. In one embodiment, the bicycle carrier includes an open hoop design that prevents spoke loading on all bicycle types. In one embodiment, the bicycle carrier is also a bicycle tune up station. In one embodiment, the bicycle carrier pivots to the ground while attached or detached to a stationary vehicle allowing for a quick and convenient on-ground standing storage. In one embodiment, the bicycle carrier holds bicycles with 29" wheels or smaller. In one embodiment, the bicycle carrier mounts using only tire touch points. In one embodiment, the bicycle carrier includes an anti-rattle hitch mounting method to secure the bicycle carrier to the vehicle preventing undesirable motion. In one embodiment, the bicycle carrier allows unmounted on-ground bicycle usage.

In an embodiment, a bicycle carrier includes a post, a hitch bar configured to couple to a trailer hitch receiver of a vehicle, and a hinge assembly coupled to the post and the hitch bar and configured to enable the post to rotate relative to the hitch bar. The hinge assembly may include a damper that dampens rotation of the post relative to the hitch bar.

In an embodiment, a bicycle carrier includes a post, a hitch bar configured to be received by a trailer hitch receiver of a vehicle, and a hinge assembly coupled to the post and the hitch bar and configured to enable to the post to rotate more than 90 degrees from a transport position.

In an embodiment, a bicycle carrier includes a post, a hitch bar configured to be received by a trailer hitch receiver of a vehicle, and hinge means for coupling the post to the hitch bar and enabling the post to rotate relative to the hitch bar.

DETAILED DESCRIPTION

Figure 1:
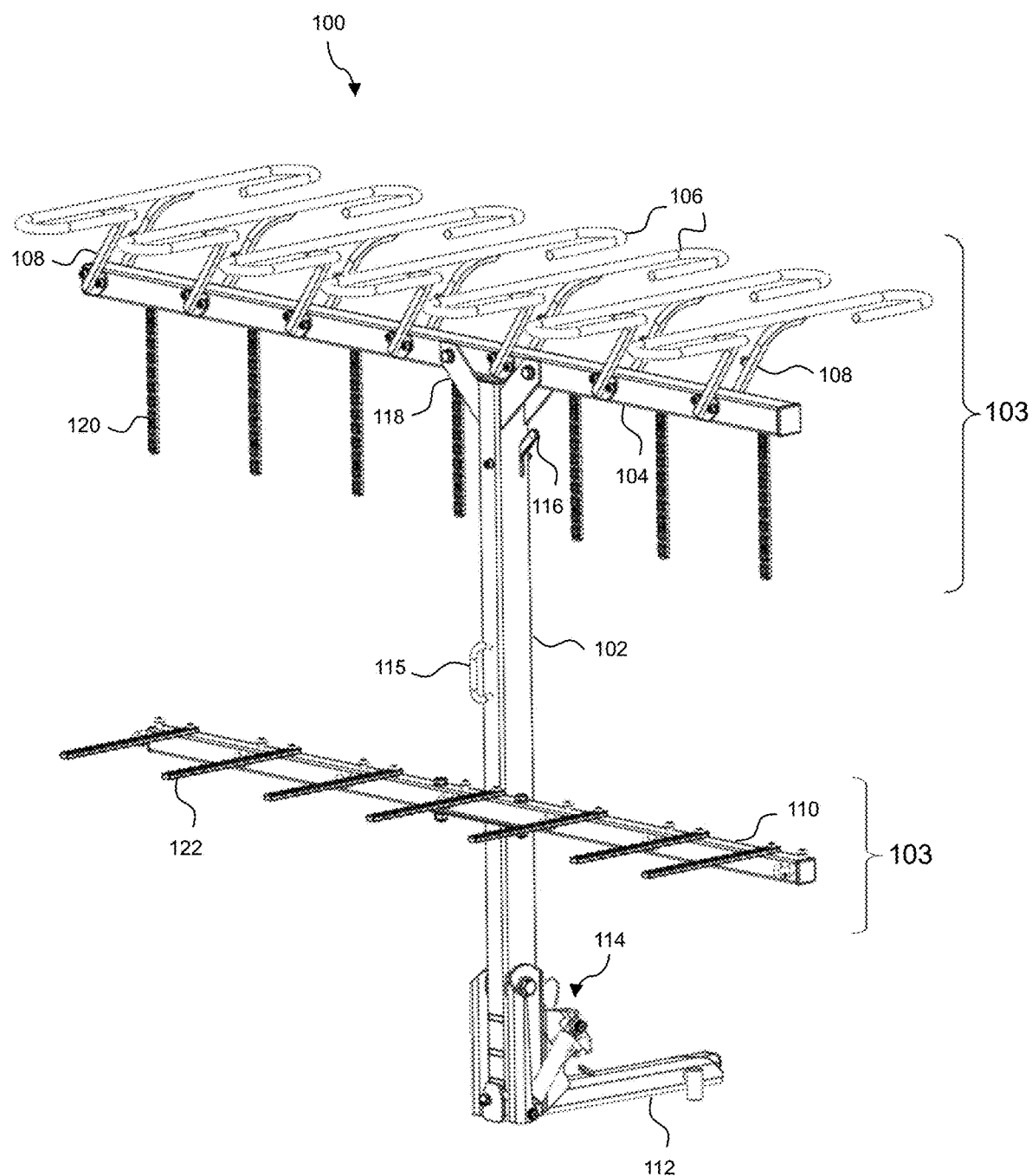
FIG. 1 is a perspective view of a bicycle carrier, according to an embodiment.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

FIG. 1 is a perspective view of a bicycle carrier 100, according to an embodiment. As used herein, the terms bicycle carrier, sports equipment carrier, sports rack, and the like are used interchangeably. Unless context dictates otherwise, the terms should be considered synonymous. The bicycle carrier 100 includes a post 102, an equipment mount 103, a hitch bar 112, and a hinge assembly 114 that rotatably couples the hitch bar 112 to the post 102. In an embodiment, the equipment mount 103 includes a first horizontal support member 104, C-hoops 106 configured to receive and hold bicycle wheels, angled support members 108, and a second horizontal support member 110. The post 102 and/or equipment mount 103 may optionally include a cable lock loop 115 configured to receive one or more locking cables or chains for securing bicycles to the bicycle carrier 100.

In the view of FIG. 1, the bicycle carrier 100 is in a raised position for transport. As used herein, the terms raised position and transport position will be understood as synonymous unless context dictates otherwise. In the transport position the hinge assembly 114 holds the post 102 at a position substantially perpendicular to the hitch bar 112. The hitch bar 112 is configured to be placed in and fixed to a trailer hitch receiver of a vehicle. In the transport position, the bicycle carrier 100 can safely carry a plurality of bicycles while coupled to a moving vehicle 124.

Figure 2:
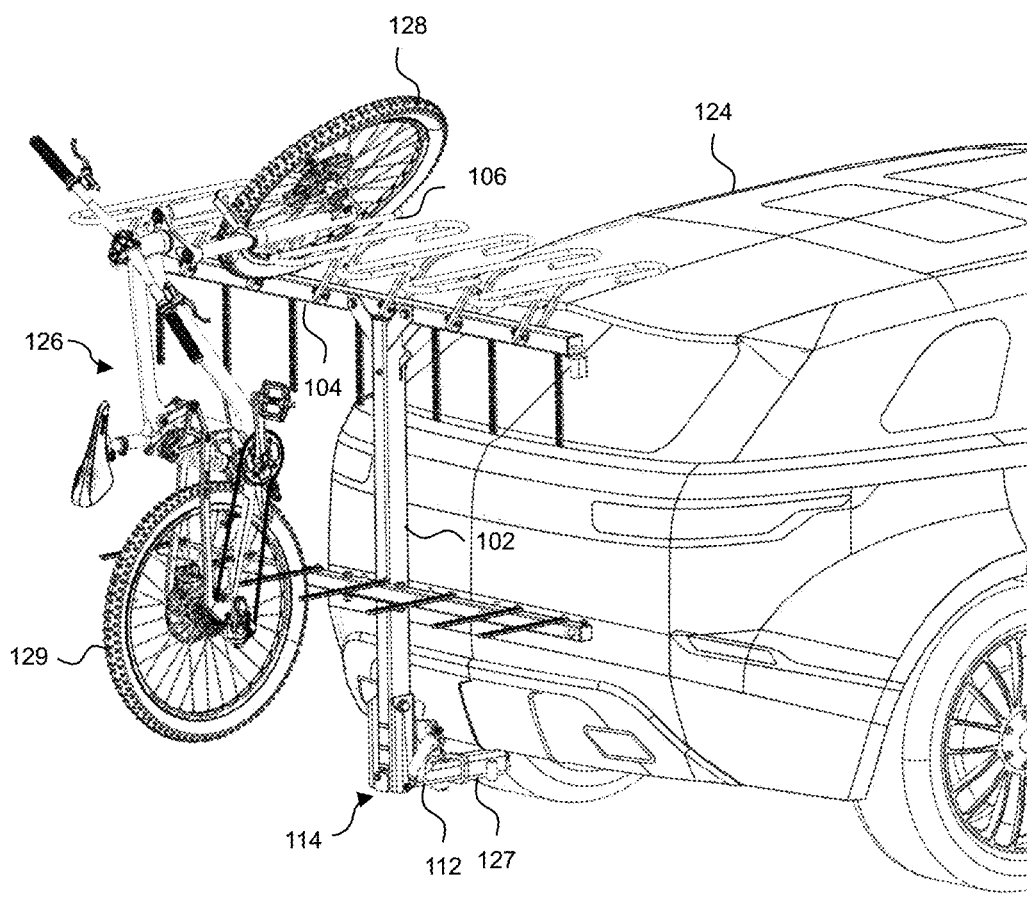
FIG. 2 is an illustration of a bicycle carrier coupled to a vehicle and carrying a bicycle, according to an embodiment.

Each C-hoop 106 is configured to receive a front wheel of a bicycle. The front wheel of a bicycle can be positioned, lowered into, or rolled into, a C-hoop 106. After being positioned in a C-hoop 106, the wheel of the bicycle comes to rest at an angle other than vertical. The wheel of the bicycle rests against the angled support members 108 and on the first horizontal support member 104. The bicycle is suspended vertically when the wheel is positioned in the C-hoop 106. This is illustrated in FIG. 2 and elsewhere in the figures. The angled support members can 108 can be coupled to the first horizontal support member 104 by bolts, welds, or other coupling devices or methods.

Each C-hoop 106 is coupled to the first horizontal support member 104 by one or more angled support members 108. In the example of FIG. 1, the support members 108 extend from the first horizontal support member 104 at an angle other than vertical. In one embodiment, the support members 108 extend at an angle of about 55° from horizontal. In this case, the wheel of the bicycle will rest in a C-hoop 106 at an angle of about 45° from horizontal. Those of skill in the art will recognize, in light of the present disclosure, that other angles are possible without departing from the scope of the present disclosure.

In one embodiment, the post 102 is about 48 inches in length. The post 102 can have width dimensions of about 2 inches by 3 inches. The first horizontal support member 104 is about 68 inches in length. The first horizontal support member 104 has width dimensions of about 2 inches by 2 inches. The second horizontal support member 110 has a length of about 64 inches. The second horizontal support member 110 has width dimensions of about 1.75 inches by 1.75 inches. The hitch bar 112 has a length of about 20 inches, with width dimensions of about 2 inches by 2 inches. In one embodiment, the post 102, the first horizontal support member 104, the second horizontal support member 110, and the hitch bar 112 are each made of steel. Those of skill in the art will recognize, in light of the present disclosure, that dimensions and materials described herein are given by way of example and that other suitable dimensions and materials can be utilized without departing from the scope of the present disclosure.

In one embodiment, the first horizontal support member 104 is coupled to the post 102 by mounting tabs 118. The mounting tabs 118 can include steel and can be fixed to the first horizontal support member 104 by bolts, by welding, or by other fasteners or methods. The mounting tabs 118 can be fixed to the post 102 by welding, bolts, or by other fasteners or methods.

In one embodiment, the post 102 includes a release lever 116. Pulling the release lever 116 enables the post 102 to be rotated relative to the hitch bar 112 via the hinge assembly 114. The post 102 can be rotated between various stopping positions, as will be described in greater detail below. The structure, components, and function of the hinge assembly 114 will also be described in greater detail below with respect to FIGS. 14-17.

In one embodiment, the bicycle carrier 100 includes a plurality of first straps 120 each coupled to the first horizontal support member 104. There is a first strap 120 for each C-hoop 106. When a bicycle wheel is placed in a C-hoop 106, the corresponding first strap 120 is looped around the wheel between two of the spokes and is fastened to a strap anchor on one of the support members 108. This can keep the wheel from moving or shifting when positioned in the C-hoop 106.

In one embodiment, the bicycle carrier 100 includes a plurality of second straps 122 each coupled to the second horizontal support member 110. There is a second strap 122 for each C-hoop 106. When a bicycle suspended from a C-hoop 106 by placing the wheel in the C-hoop 106, the bicycle will be suspended vertically, and the rear wheel will be in contact with the second horizontal support member 110. The second strap 122 can be looped between two spokes on the rear wheel and connected to a fastener positioned on the second horizontal support member 110. This will keep the keep the rear wheel from shifting relative to the second horizontal support member 110 during transport. Those of skill in the art will recognize, in light of the present disclosure, that other fastening methods can be used to secure the bicycle suspended from one of the C-hoops 106.

The word "vertical" in the term post 102 refers to the position of the post 102 when in the transport configuration. The transport configuration corresponds to the configuration in which the bicycle carrier 100 is coupled to a vehicle, is carrying one or more bicycles 126, 126a, 126b, and is actively being transported. In this case, the post 102 is substantially perpendicular to the hitch bar 112 and extends substantially vertically relative to flat ground. Those of skill in the art will recognize, that the post 102 can be rotated to positions other than vertical. Additionally, the bicycle carrier 100 can be laid in positions in which the post 102 would not extend in a vertical direction. Accordingly, the word "vertical" in the term post 102 refers to the orientation of the post 102 in a particular transport configuration. Similarly, the word "horizontal" in the terms first and second horizontal support member 104, 110, refers to the orientation of the support member 104, 110 during the transport configuration. The bicycle carrier 100 could be laid in positions in which the first and the second horizontal support members 104, 110 would not extend in the horizontal direction. In one embodiment, the bicycle carrier 100 can include a post 102 that is not necessarily vertical in the transporting position. Additionally, the bicycle carrier 100 can include first and second support members 104, 110 that are not horizontal.

FIG. 2 is an illustration of a bicycle carrier 100 coupled to a vehicle 124 and carrying a bicycle 126, according to an embodiment. The hitch bar 112 of the bicycle carrier 100 has been inserted in and coupled to a trailer hitch receiver 127 of the vehicle 124. The hitch bar 112 can be coupled to the trailer hitch receiver 127 by bolts and pins or other common fastening configurations, as will be described in more detail below.

The front wheel 128 of the bicycle 126 is positioned in one of the C-hoops 106. When the front wheel 128 is positioned in the C-hoop 106, the front wheel 128 rests at a non-vertical angle. The front wheel 128 rests on the first horizontal support member 104. The front wheel 128 is also in contact with one or more support members 108. The bicycle 126 is suspended vertically. The rear wheel 129 rests against the second horizontal support member 110. When describing how the front and the rear wheels 128, 129 rest on or are supported by various support members, it is understood that the tires may actually be in contact with the various support members.

The post 102 is in the transport position in which the post 102 extends substantially perpendicularly from the hitch bar 112.

While FIG. 2 shows a single bicycle 126 carried by the bicycle carrier 100, in practice, the bicycle carrier 100 can carry multiple bicycles 126. In particular, the bicycle carrier 100 can carry a bicycle 126 for each C-hoop 106. Accordingly, each C-hoop 106 can receive a front wheel 128 of a respective bicycle 126.

Figure 3:
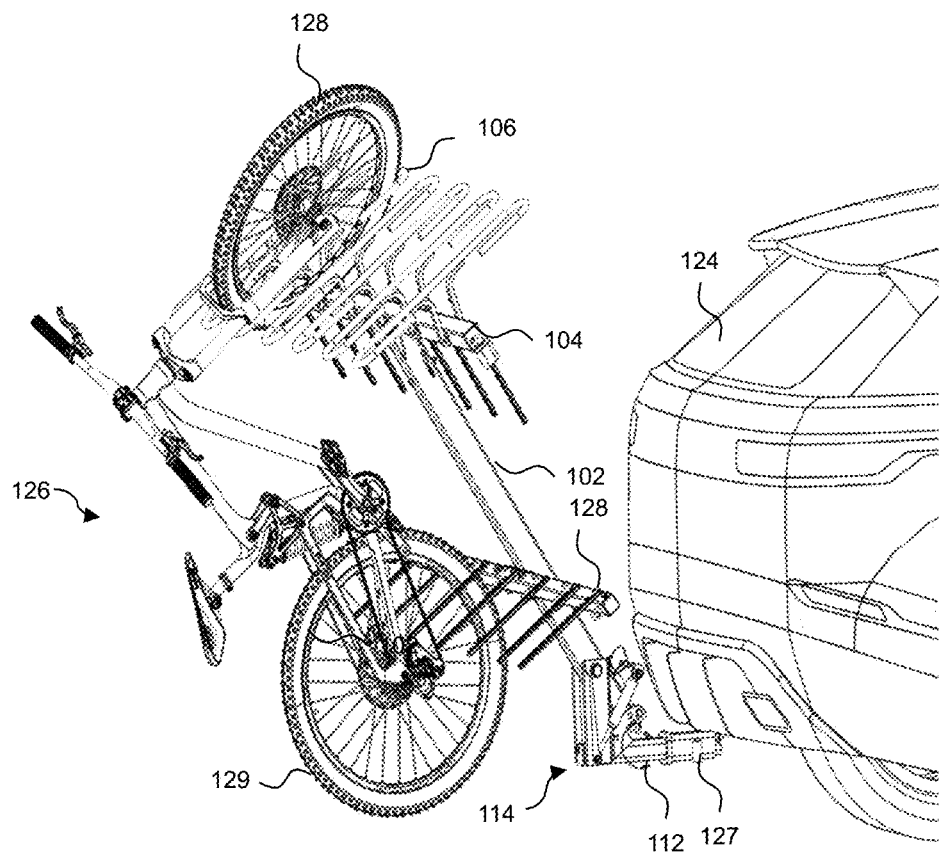
FIG. 3 illustrates a bicycle carrier carrying a bicycle and coupled to a vehicle while at a loading position, according to one embodiment.

FIG. 3 illustrates a bicycle carrier 100 carrying a bicycle 126 and coupled to a vehicle 124 while at a loading position, according to one embodiment. The hinge assembly 114 defines a loading stop position. When the release lever 116 is pulled, the hinge assembly 114 enables the post 102 to rotate relative to the hinge bar 112 to a loading stop position. At the loading stop position, the post 102 is oriented at about 33° from vertical, in one example. This enables bicycles 126 to more easily be loaded onto or off of the bicycle carrier 100. This is because the C-hoops 106 are both lower to the ground and oriented at an angle that facilitates easy loading and unloading of bicycles 126.

As will be described in more detail below, hinge motion is slowed by dampers/gas springs included in the hinge assembly 114. This damping enhances the safety of rotating between the transport position and the load position.

In one embodiment, each bicycle 126 can be accessed without the removal of other bicycles 126. Loading bicycles 126 can also be done in the full vertical (transport mode) or in the angled back loading position. In one embodiment, moving from the hinged position requires an upward and forward force toward the vehicle 124 to move from the loading (hinged) position until the post 102 automatically locks in the vertical or transport position.

Figure 4:
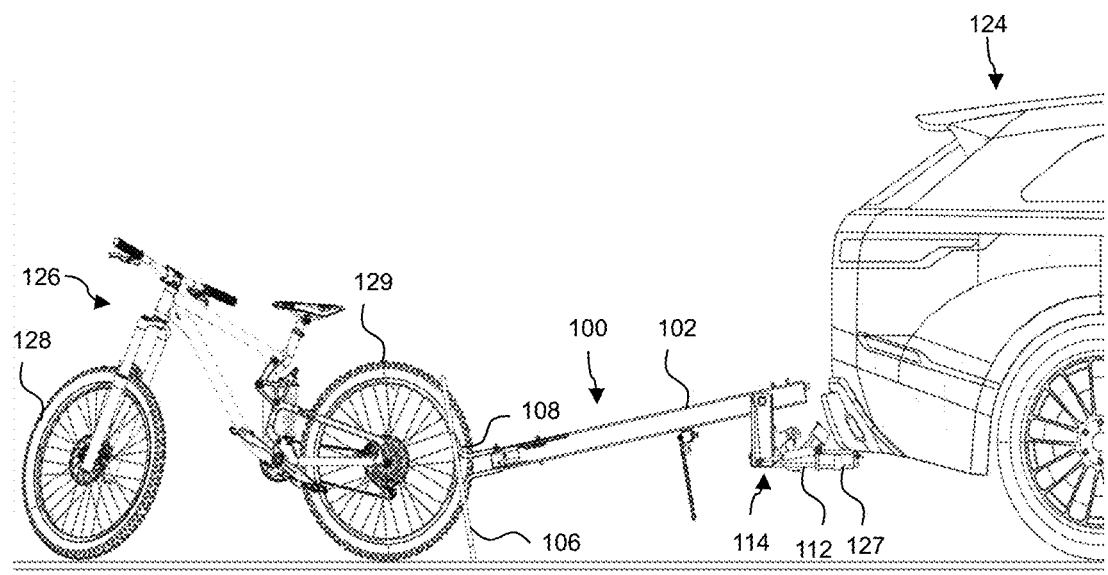
FIG. 4 is a side view of a bicycle carrier coupled to a vehicle and in a stabilization configuration, according to an embodiment.

FIG. 4 is a side view of a bicycle carrier 100 coupled to a vehicle 124 and in a stabilization configuration, according to an embodiment. In the stabilization configuration, the post 102 is rotated more than 90° from the transport position by operation of the hinge assembly 114. The C-hoops 106 rest on the ground. A bicycle 126 is stabilized by the bicycle carrier 100. In particular, the rear wheel 129 of the bicycle 126 is positioned in the C-hoop 106. The C-hoop 106 stabilizes the rear wheel 129 so that the bicycle 126 will not fall over. The first strap 120 can be utilized to strap the rear wheel 129 to the C-hoop 106.

This configuration is useful in situations in which the vehicle 124 will be parked and bicycles 126 will be periodically used. When a bicycle 126 is not used, it can be positioned in the C-hoop 106 as shown in FIG. 4. When a bicycle 126 is to be used, the bicycle 126 can easily be removed from the C-hoop 106. This configuration can be particularly useful in situations like camping when bicycles 126 may be ridden to and from camp. Instead of being laid on the ground are rested against trees or other structures, each bicycle 126 can be positioned in a C-hoop 106 for stabilization.

Figure 5:
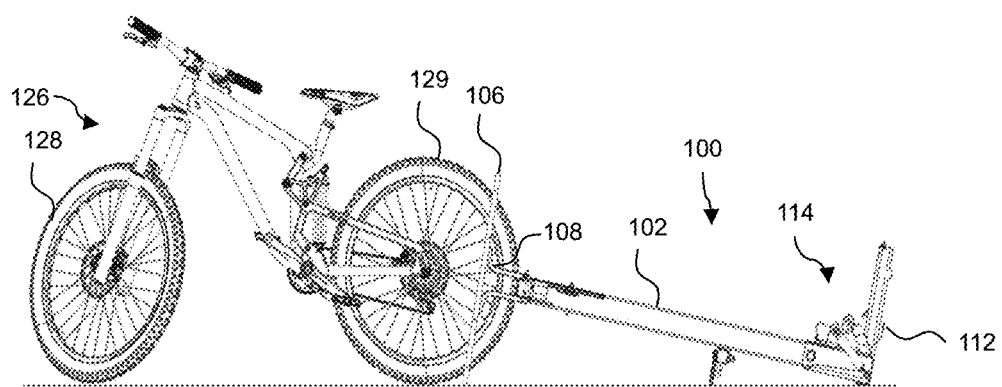
FIG. 5 is a side view of a bicycle carrier positioned on the ground and stabilizing a bicycle, according to an embodiment.

FIG. 5 is a side view of a bicycle carrier 100 positioned on the ground and stabilizing a bicycle 126, according to an embodiment. In this example, the post 102 and the hinge part 112 are oriented in the transport position by the hinge assembly 114. However, the bicycle carrier 100 is not coupled to a vehicle 124. Instead, the bicycle carrier 100 is laid on the ground. The C-hoops 106 rest on the ground similar to the configuration shown in FIG. 4. The bicycle carrier 100 can stabilize a plurality of bicycles 126 in this configuration by positioning the rear wheels 129 of the bicycles 126 in the C-hoops 106.

Figure 6:
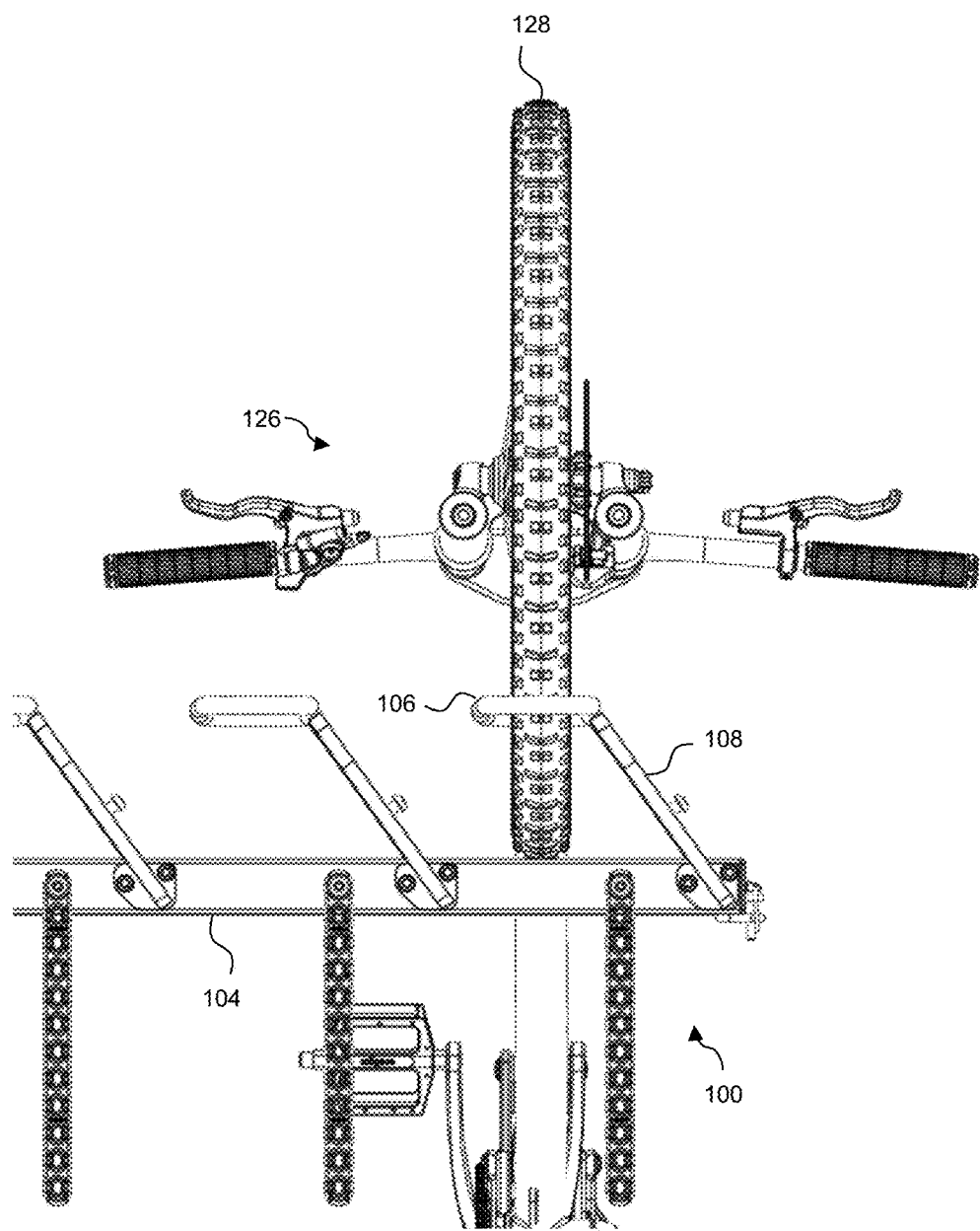
FIG. 6 is a view of the bicycle carrier during a loading sequence of the bicycle, according to an embodiment.

FIG. 6 is a view of the bicycle carrier 100 during a loading sequence of the bicycle 126, according to an embodiment. The front wheel 128 of the bicycle 126 is lowered into the C-hoop 106. While the front wheel 128 is loaded into the C-hoop 106, the front wheel 128 can be substantially vertically oriented. After loading, the front wheel 128 will settle at an angle other than vertical.

Figure 7:
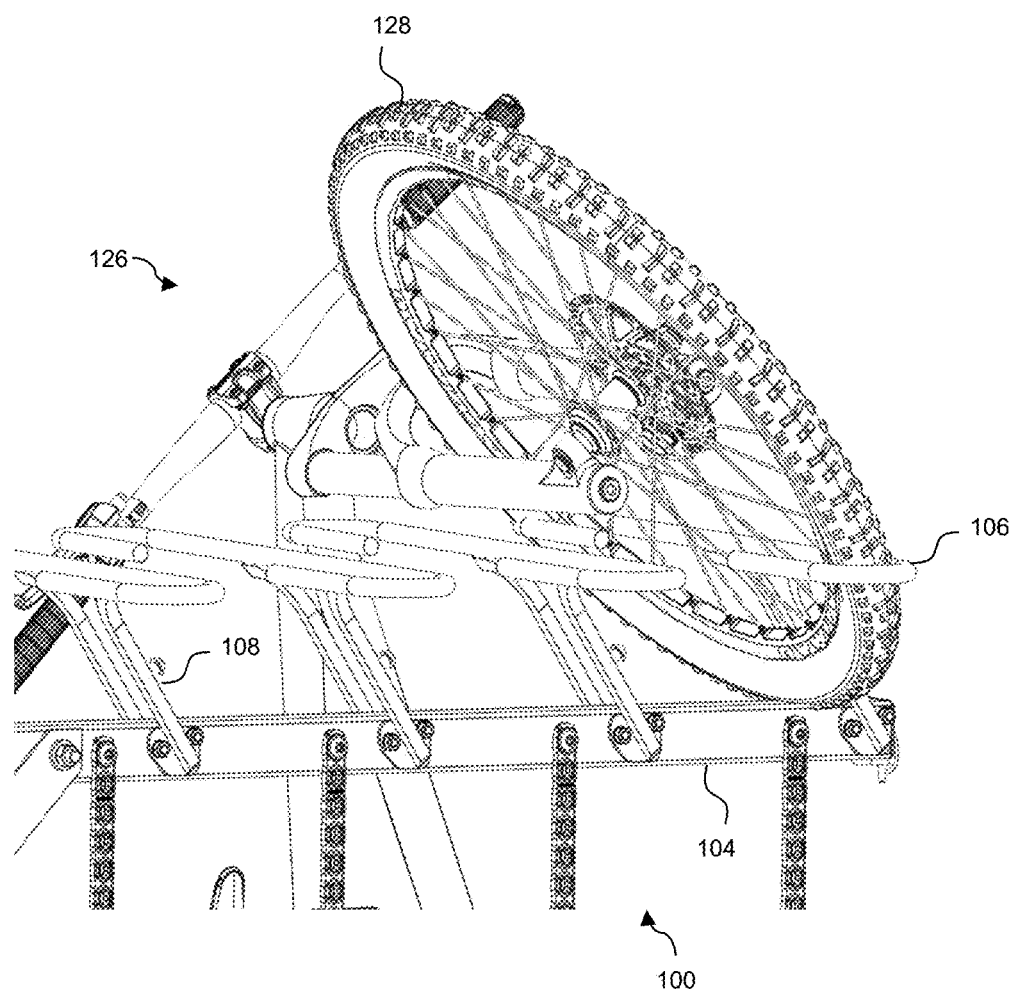
FIG. 7 is a view of the bicycle carrier after a loading sequence of the bicycle, according to an embodiment.

FIG. 7 is a view of the bicycle carrier 100 after a loading sequence of the bicycle 126, according to an embodiment. The front wheel 128 of the bicycle 126 is positioned in the C-hoop 106. The front wheel 128 has settled to a position such that the front wheel 128 is not oriented vertically, but rather is oriented at an angle relative to vertical. In one example, the angle is 45°.

Figure 8:
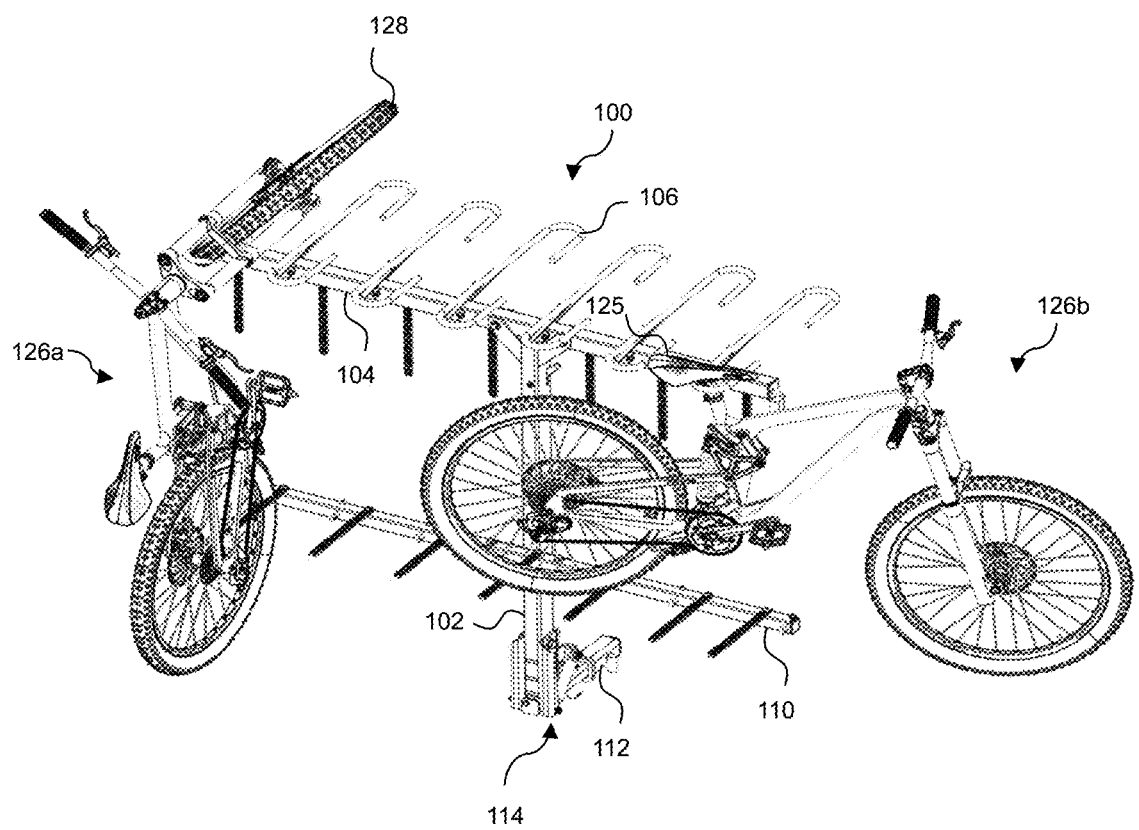
FIG. 8 is a view of a bicycle carrier supporting a first bicycle and a second bicycle mounted in a tune-up position, according to an embodiment.

FIG. 8 is a view of a bicycle carrier 100 supporting a first bicycle 126a and a second bicycle 126b mounted in a tune-up position, according to an embodiment. The first bicycle 126a is supported in a standard fashion with the front wheel 128 position in a C-hoop 106. The second bicycle 126b is supported by positioning a seat post within a C-hoop 106 such that a seat 125 of the second bicycle 126b rests on and is supported by the C-hoops 106.

The shape of the C-hoop 106 enables the second bicycle 126b to be suspended by the seat 125. Because the C-hoop 106 includes first and second terminations 130, 132 (see FIGS. 12 and 13), the seat post of the second bicycle 126b can be easily maneuvered through a gap 131 (see FIGS. 12 and 13). The second bicycle 126b can then be suspended by the seat 125, as shown in FIG. 8.

In one embodiment, when the second bicycle 126b is suspended by the seat 125, maintenance or repairs can be performed easily on the second bicycle 126b because the wheel and pedals are free to rotate. Accordingly, the bicycle carrier 100 can act as a repair station for bicycles 126.

Figure 9A:
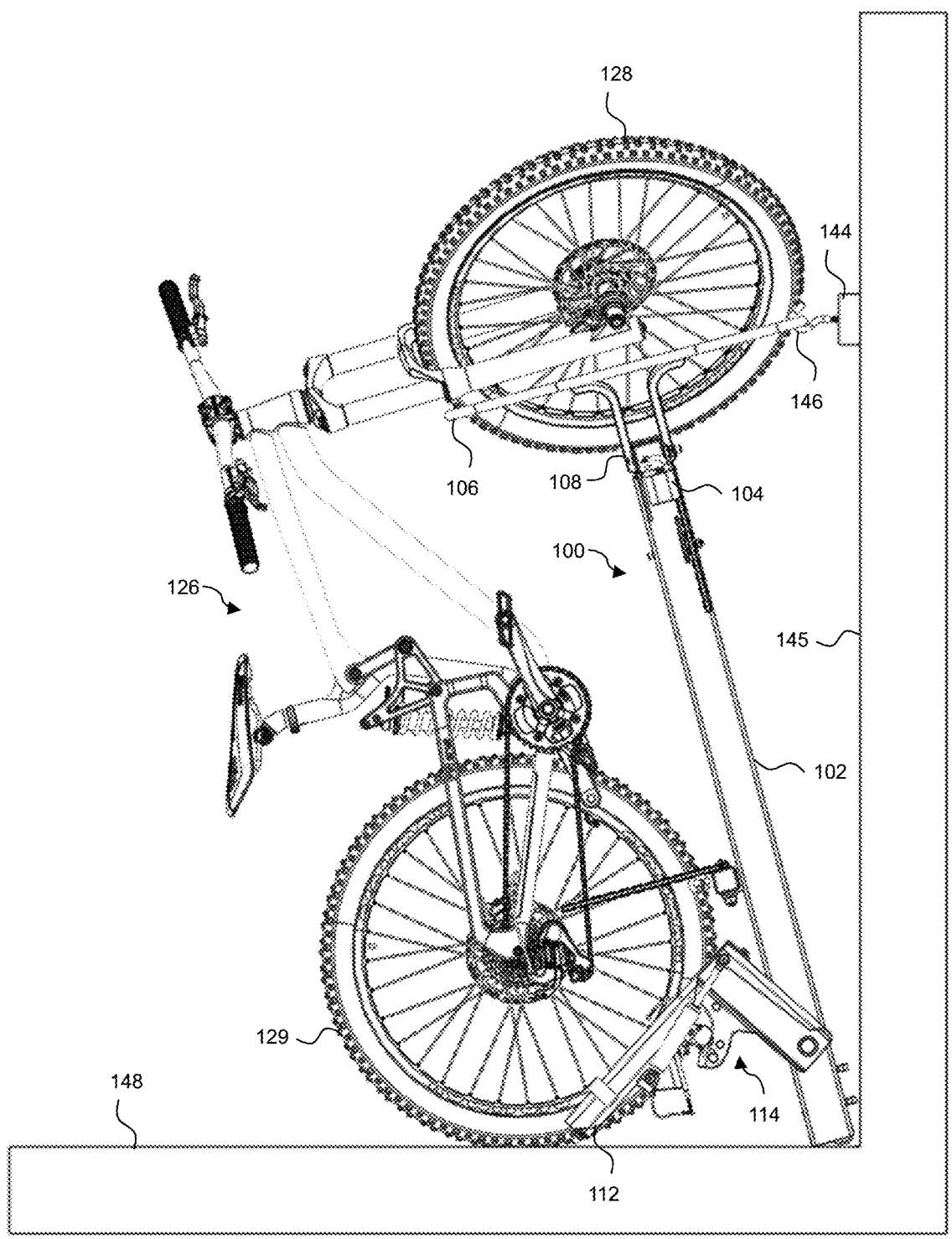
FIG. 9A is a side view of a bicycle carrier in a wall-mounted configuration, according to an embodiment.

FIG. 9A is a side view of a bicycle carrier 100 in a wall-mounted configuration, according to an embodiment. The hinge assembly 114 is operated such that the post 102 has rotated more than 90° from the transport position to a storage or wall-mounted position. In one example, in the wall-mounted or storage position, the post 102 is rotated about 150° relative to the hinge bar 112 from the transport position.

In one embodiment, the wall-mounted position is suitable for coupling the bicycle carrier 100 to a wall mount structure 144. The wall mount structure 144 can include one or more boards, beams, or bent sheet metal coupled to a wall 145 of a structure, such as a garage. One or more hooks 146 are coupled to the wall mount structure 144. The bicycle carrier 100 is coupled to the wall mount structure 144 by positioning one or more of the C-hoops 106 on one or more of the hooks 146. The post 102 and the hitch bar 112 are in contact with a floor 148 or on top of a small spacer sitting on the floor 148.

In the wall-mounted position, a bicycle 126 can be loaded into a C-hoop 106 by rolling the back wheel 129 with the front wheel 128 in the air until the front wheel 128 can be positioned in the C-hoop 106. In some cases, this may require lifting the bicycle 126 to enable the front wheel 128 to slide into the C-hoop 106. The downward tilting angle of the C-hoop 106 makes it relatively easy to place the front wheel 128 of a bicycle 126 in the C-hoop 106. Each C-hoop 106 of the bicycle carrier 100 can receive a respective bicycle 126 in the wall-mounted configuration.

Figure 9B:
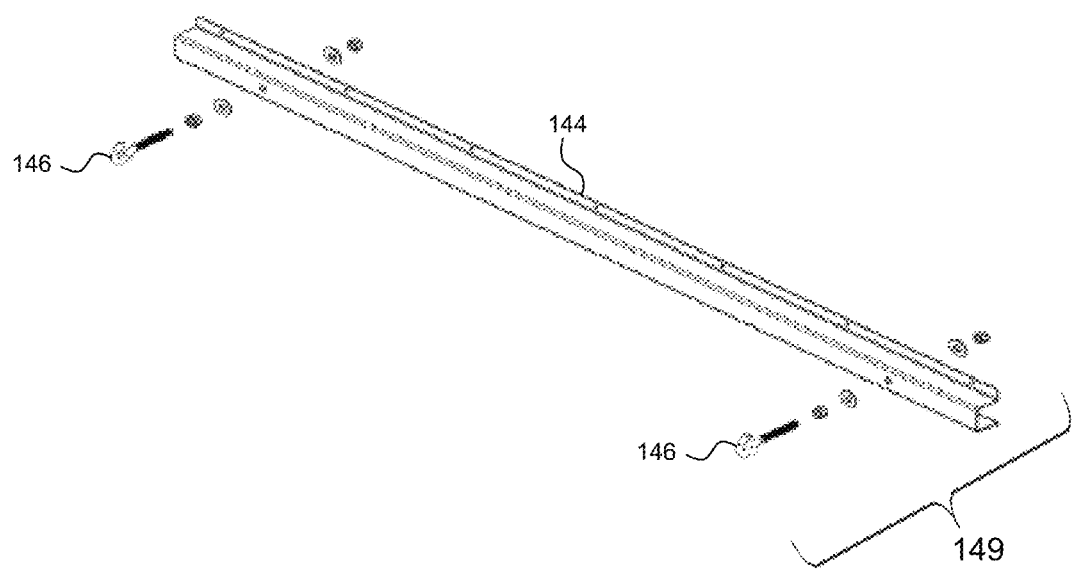
FIG. 9B is a view of a wall mount system used in the wall-mounted configuration of the bicycle carrier described in FIG. 9A, according to an embodiment.
Figure 9C:
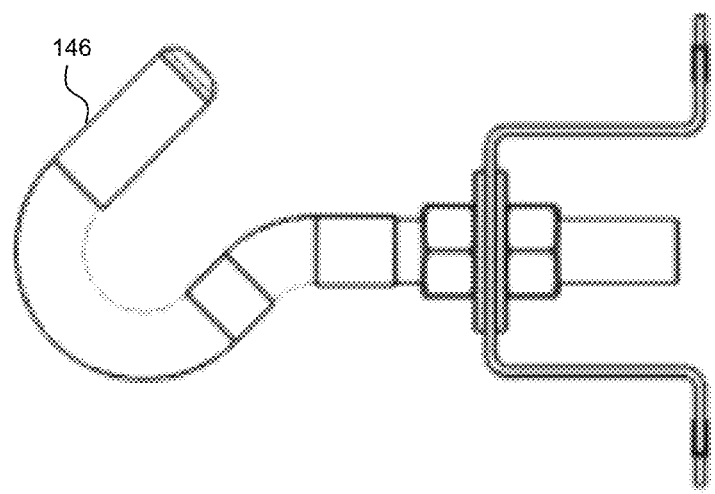
FIG. 9C is a detailed view of the wall mount fittings shown in FIG. 9B, according to an embodiment.

FIG. 9B is a view of a wall mount system used in the wall-mounted configuration of the bicycle carrier 100 described in FIG. 9A, according to an embodiment. FIG. 9C is a detailed view of the wall mount fittings 149 described in FIG. 9B, according to an embodiment.

Referring to FIGS. 9B and 9C, in an embodiment, the bicycle carrier 100 further includes a wall mount bar 144 (e.g., wall mount structure 144 of FIG. 9A) configured to be screwed to a wall 145, such as using wood screws to be screwed into wall studs, and one or more wall mount fittings 149 (such as one or more hooks 146) configured to be coupled to the wall mount bar 144 and configured to receive and hold a feature of the equipment mount 103. In an embodiment, the wall mount system uses two wall mount fittings 149, the two wall mount fittings 149 being configured to hook around respective C-hoops 106.

Figure 10:
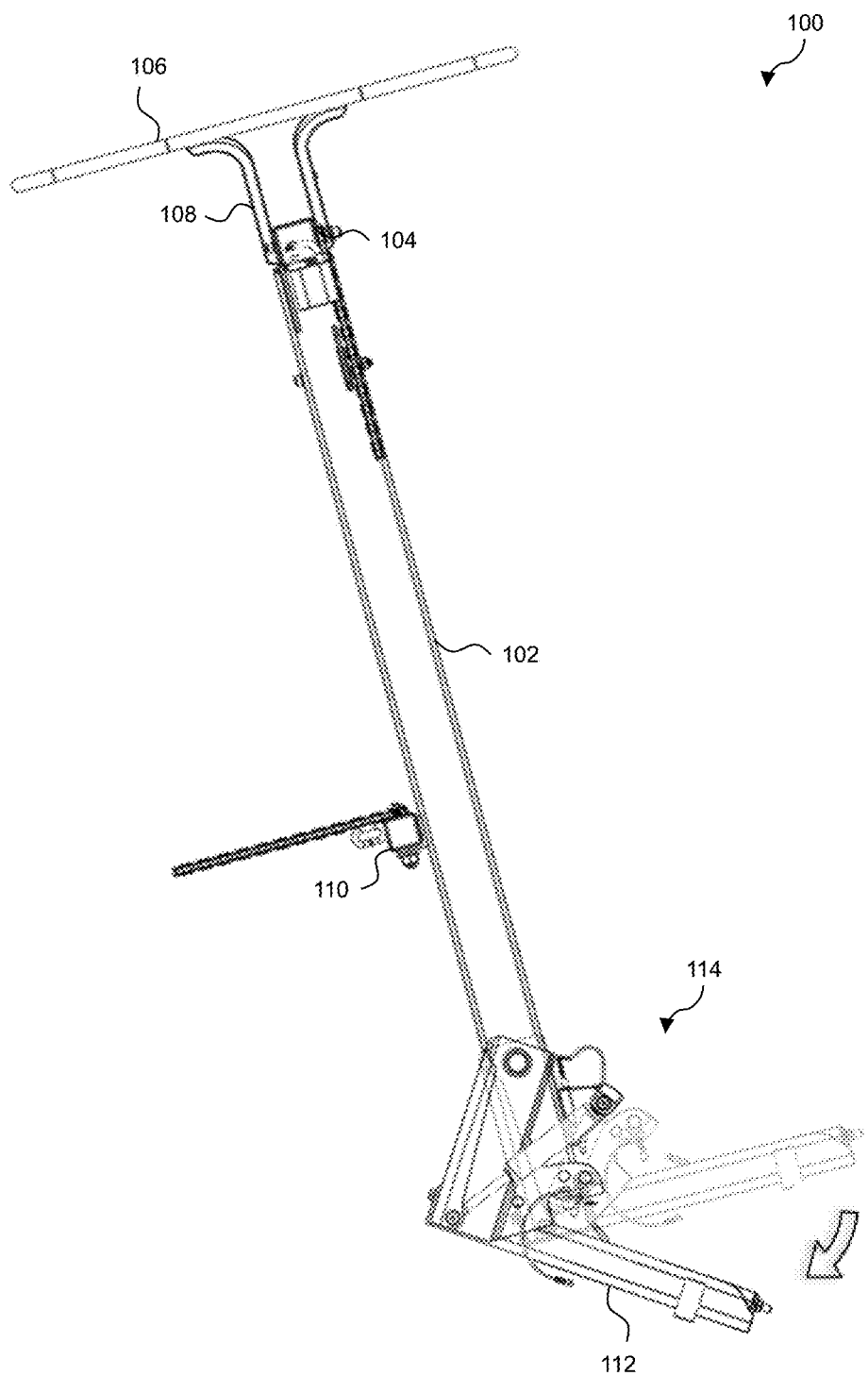
FIG. 10 is a side view of a bicycle carrier in a loading position, according to an embodiment.

FIG. 10 is a side view of a bicycle carrier 100 in a loading position, according to an embodiment. The hinge assembly 114 has enabled the post 102 to rotate about 33 degrees from the transport position to the loading position.

Figure 11:
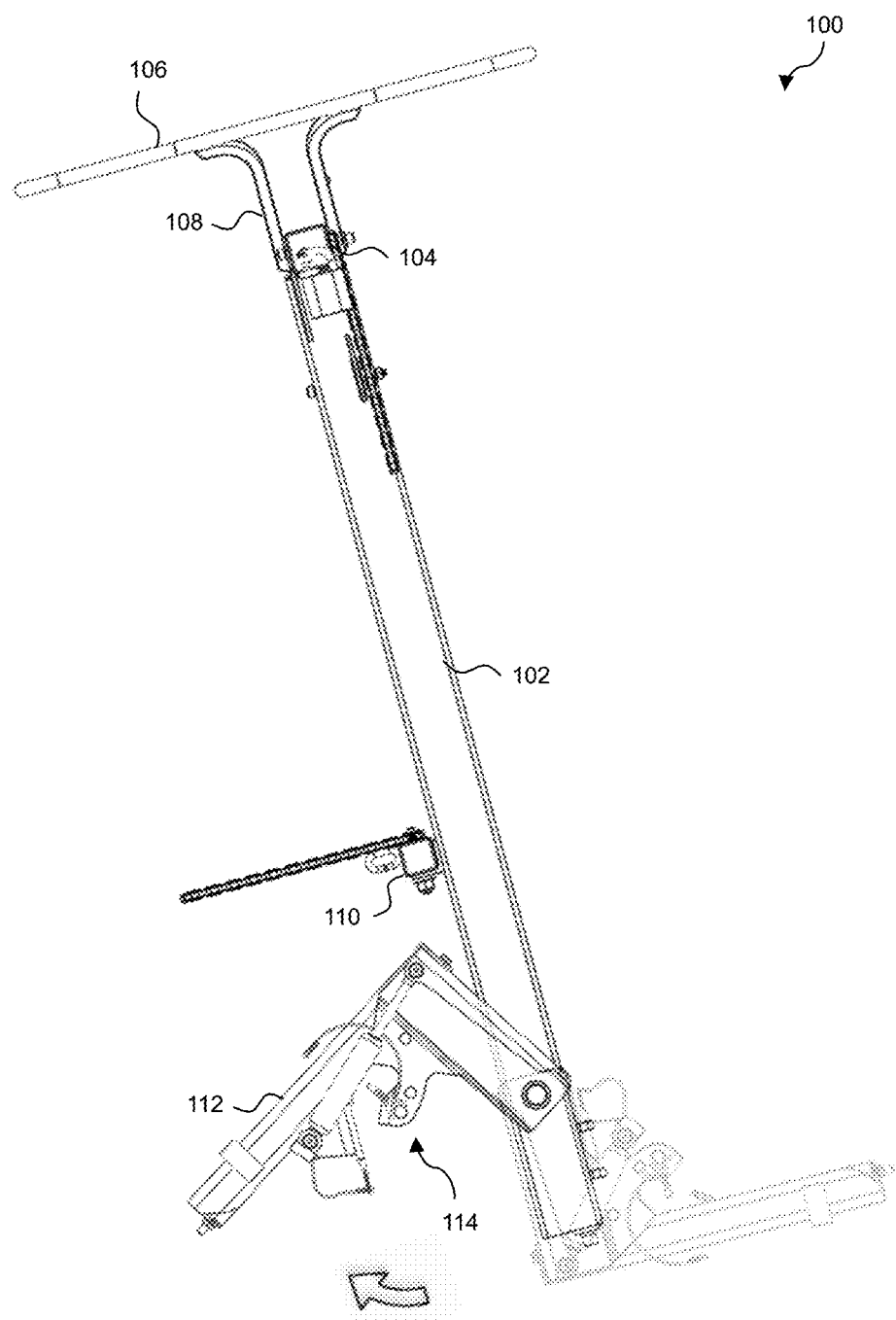
FIG. 11 is a side view of a bicycle carrier in a storage position, according to an embodiment.

FIG. 11 is a side view of a bicycle carrier 100 in a storage position, according to an embodiment. The hinge assembly 114 has enabled the post 102 to rotate about 150 degrees from the transport position to the storage position.

Figure 12:
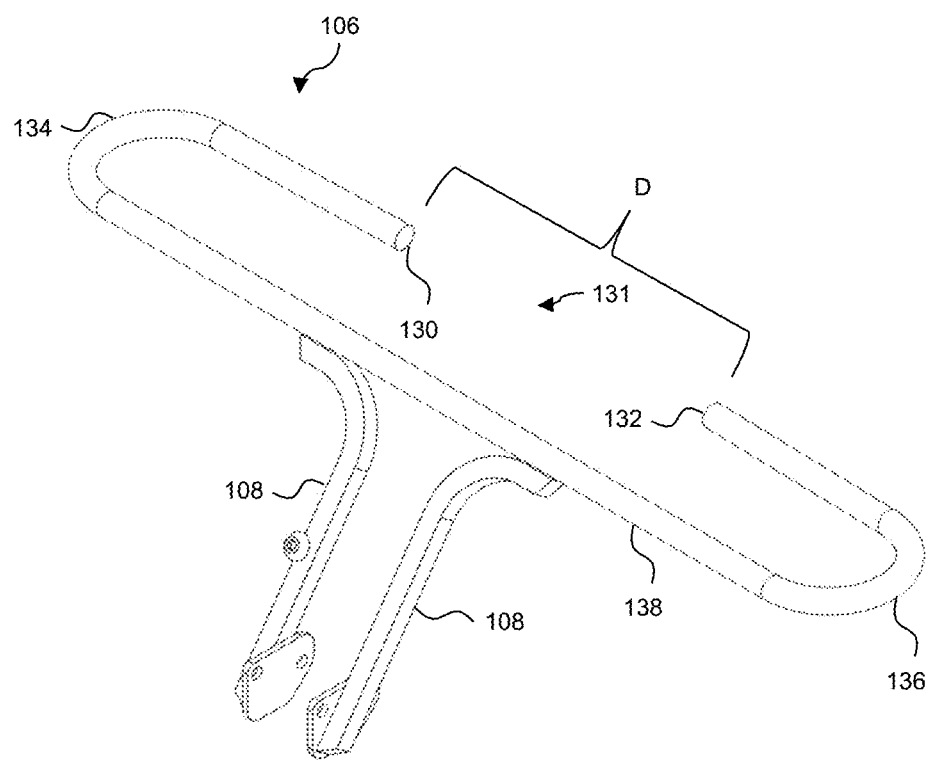
FIG. 12 is a perspective view of a C-hoop and angled support members, according to an embodiment.

FIG. 12 is a perspective view of a C-hoop 106 and angled support members 108, according to an embodiment. The C-hoop 106 is substantially in the shape of a letter C. The C-hoop 106 includes two terminations, 130, 132. The two terminations 130, 132 define a gap 131 between the two terminations 130, 132. The C-hoop 106 includes a first bend 134, a second bend 136, and a straight portion 138 extending between the first and the second bends 134, 136.

In one embodiment, the length of the C-hoop 106 is 26 inches. The length is defined as the internal distance between the farthest points of the first bend 134 and the second bend 136. Those of skill in the art will recognize, in light of the present disclosure, that a C-hoop 106 can have a length other than 26 inches without departing from the scope of the present disclosure.

In one embodiment, the width of the C-hoop 106 is 3.5 inches. The width is defined as the shortest distance between the straight portion 138 and either of the terminations 130 or 132. Those of skill in the art will recognize, in light of the present disclosure, that a C-hoop 106 can have a width other than 3.5 inches without departing from the scope of the present disclosure.

In one embodiment, the distance D between the first termination 130 and the second termination 132 is about 10 inches. Accordingly, the gap 131 between the first and the second terminations 130, 132 is 10 inches. Those of skill in the art will recognize, in light of the present disclosure, that the C-hoop 106 can include a gap 131 of other than 10 inches between the first and the second terminations 130, 132 without departing from the scope of the present disclosure.

In one embodiment, the shape of the C-hoop 106 provides many benefits. For example, when a front wheel 128 is inserted into the C-hoop 106, the front wheel 128 can enter at an angle substantially perpendicular to the plane defined by the C-hoop 106. Because the C-hoop 106 terminates at the terminations 130, 132 without additional structure extending downward from the area of the terminations 130, 132, the front wheel 128 can be loaded at a convenient perpendicular angle. If the C-hoop 106 did not terminate at the terminations 130, 132, but rather extended downward at an angle similar to the angled support members 108, then the front wheel 128 would need to be loaded at an angle other than perpendicular so it can slide into the C-hoop 106.

Loading the front wheel 128 at an angle other than perpendicular is highly inconvenient and awkward. Accordingly, the shape of the C-hoop 106 as shown in FIG. 12 avoids this drawback. After the front wheel 128 has been inserted into the C-hoop 106, the front wheel 128 will then come to a resting position at an angle other than perpendicular. In the resting position, the tire is in contact with an interior surface of the angled support members 108 and the first horizontal support member 104.

Another benefit of the C-hoop 106 is that the gap 131 is situated so that in the resting position, the spokes of the front wheel 128 do not contact the C-hoop 106. If the C-hoop 106 was a complete hoop instead of having the gap 131, then it is possible that the spokes would be in contact with the C-hoop 106 when in the resting position. The resulting pressure on the spokes could result in bent or otherwise damaged spokes.

In one embodiment, the C-hoop 106 is a single integral structure. For example, the C-hoop 106 can correspond to a single bar or rod that is bent into the shape shown in FIG. 12. Alternatively, the C-hoop 106 can include multiple sections connected together to form the shape shown in FIG. 12.

In one embodiment, the C-hoop 106 is steel. Other sufficiently strong materials can be used for the C-hoop 106.

In one embodiment, when the bicycle carrier 100 is in the transport position, the C-hoop 106 defines a plane substantially parallel to the ground, or perpendicular to the vertical direction. For example, if a flat board is laid on top of the C-hoop 106 when in the transporting configuration, the plane of the board would be parallel to the ground or perpendicular to the vertical direction.

Figure 13:
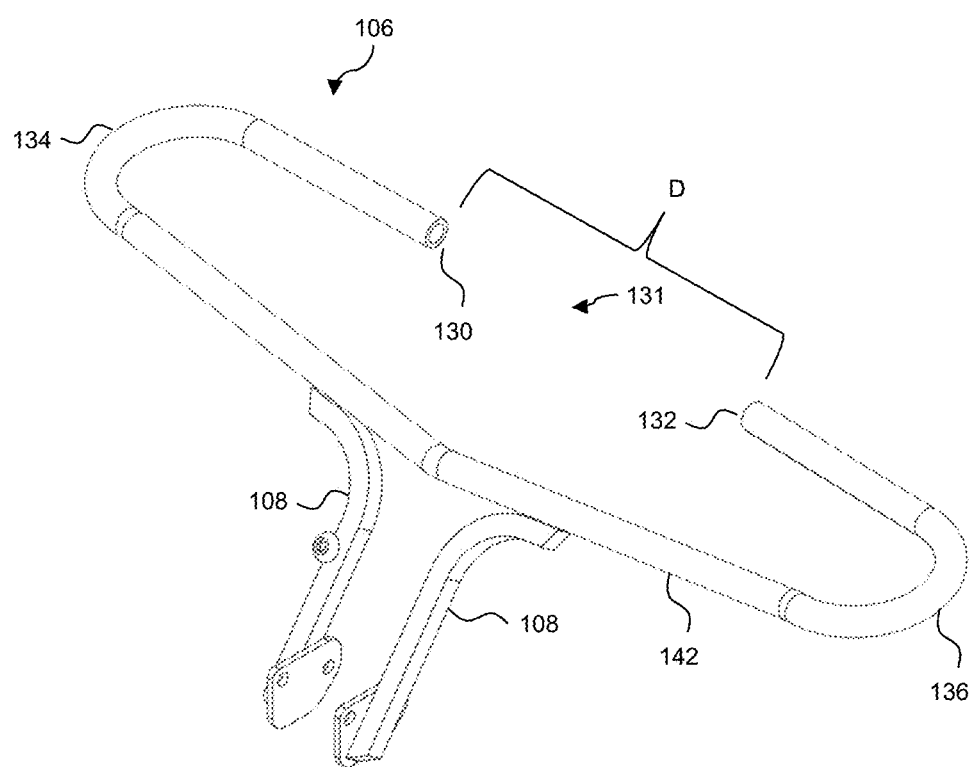
FIG. 13 is a perspective view of a C-hoop and angled support members, according to an alternate embodiment.

FIG. 13 is a perspective view of a C-hoop 106 and angled support members 108, according to an alternate embodiment. The C-hoop 106 is substantially in the shape of a C. However, instead of a straight portion 138 extending between the first and the second bends 134, 136, a bent portion 142 extends between the first and the second bends 134, 136. Otherwise, the C-hoop 106 of FIG. 13 is substantially similar to and provides similar benefits as the C-hoop 106 of FIG. 12.

Figure 14:
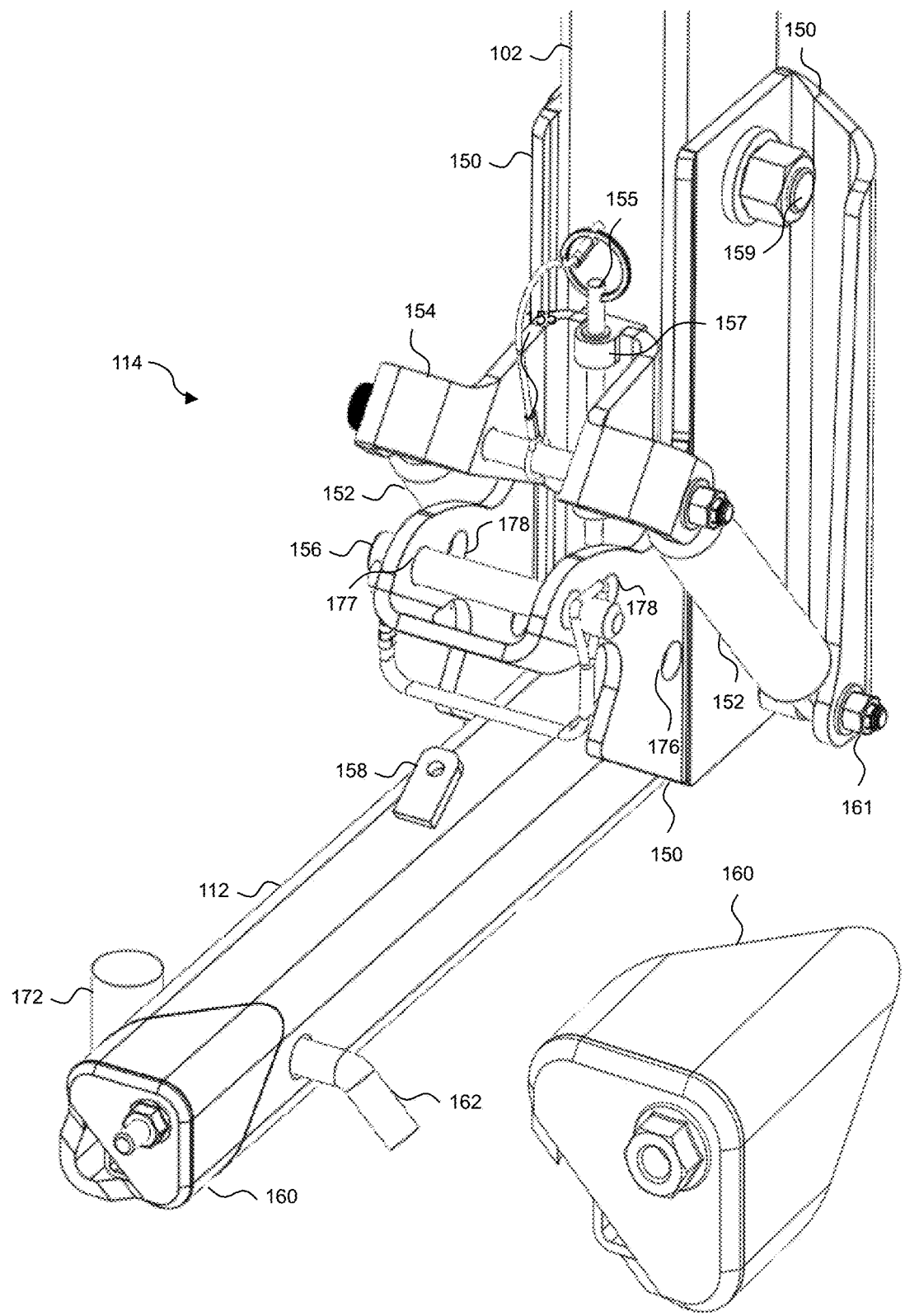
FIG. 14 is an isometric view of a hinge assembly of a bicycle carrier and wedge, according to an embodiment.

FIG. 14 is an isometric view of a hinge assembly 114 of a bicycle carrier 100 and wedge 160, according to an embodiment. FIG. 14 also shows portions of the hitch bar 112 and post 102 coupled to the hinge assembly 114. The hinge assembly 114 allows rotation of the post 102 relative to the hitch bar 112.

In one embodiment, the hinge assembly 114 includes a bracket 150, dampers 152, a damper yoke 154, a damper pin 155, a hinge stop pin 156, and a bolt 159. The bracket 150 is fixed to the hitch bar 112 by one or more bolts or welds. The bolt 159 is coupled to the bracket 150 and passes through the post 102. The bolt 159 acts as an axle for rotation of the post 102. When the post 102 rotates, it rotates about the bolt 159.

In one embodiment, the bracket 150 is a unitary structure. In one embodiment, the bracket 150 is steel.

In one embodiment, when the release lever 116 is pulled, the hinge assembly 114 enables rotation of the post 102 relative to the hitch bar 112. The dampers 152 slow, resist, or oppose the rotation. This enhances the safety of the bicycle carrier 100. This is because when rotating between the transport and the loading positions, the rotation cannot happen rapidly due to the dampers 152. This ensures that the post 102 will not quickly fall or rotate when rotation is enabled, potentially injuring somebody or damaging the bicycle carrier 100. Instead, after rotation is enabled by pulling the release lever 116, some force may need to be applied by an individual to cause rotation against the force of the dampers 152 when no bicycles are on the rack.

In one embodiment, the dampers 152 include hydraulic damping. The dampers 152 can include the fluid chamber and a piston. Flow of a fluid into or out of the fluid chamber is inhibited by a relatively small aperture, and potentially by the viscosity of the fluid. Rotation of the post 102 relative to the hitch bar 112 is opposed by this hydraulic effect. In one embodiment, the fluid is a liquid. In one embodiment, the fluid is an oil. In one embodiment, the fluid is a gas.

In one embodiment, the dampers 152 can include one or more springs that resist rotation of the post 102 relative to the hitch bar 112. In one embodiment, the dampers 152 can include gas springs. Those of skill in the art will recognize, in light of the present disclosure, that many other types of dampers 152 can be used without departing from the scope of the present disclosure.

In one embodiment, the dampers 152 are mounted between the hitch bar 112 and the damper yoke 154. The dampers 152 are coupled to the hitch bar 112 by a bolt 161.

In one embodiment, the hinge stop pin 156 defines a stop point for rotation of the post 102 relative to the hitch bar 112. In particular, when rotating from the transport position to the loading position, the hinge stop pin 156 stops rotation at the transport position. In one embodiment, the loading position is a 33° rotation from the transport position. The bracket 150 includes multiple sets of apertures 176, 177, 178 for receiving the hinge stop pin 156. The hinge stop pin 156 is placed in the apertures 177 in FIG. 14. The hinge stop pin 156 can be placed in the apertures 178 to reduce the angle of the loading position relative to the transport position. The hinge stop pin 156 can be placed in the apertures 176 to substantially prohibit rotation of the post 102 from the transport position. The hinge stop pin 156 can be tied to the bracket 150 by a tie.

The post includes 102 include first damper pin receivers 157 for receiving a damper pin 155. The damper yoke 154 is placed in the damping position as shown in FIG. 14. In the damping position, the dampers 152 dampen or resist rotation of the post 102. The damper pin 155 is placed in the first damper pin receivers 157, thereby fixing the damper yoke 154 to the post 102 in the damping position. The damper pin 155 can be tied to the damper yoke 154 by a tie.

In one embodiment, to enable rotation of the post 102 to the wall mounting position, the damper pin 155 and the hinge stop pin 156 are removed. With the damper pin 155 removed, the damper yoke 154 can be decoupled from the post 102 and moved to a damper release position in which the dampers 152 do not dampen or resist rotation of the post 102. With the damper pin 155 removed from the first damper pin receivers 157, the hinge stop pin 156 removed, and the release lever 116 pulled, the post 102 can rotate beyond the loading position to the wall mounting position. This can correspond to rotation of up to 150 degrees from the transport position.

The hitch bar 112 includes a second damper pin receiver 158. The damper pin 155 can be received in the second damper pin receiver 158 to secure the damper yoke 154 in the damper release position.

In one embodiment, a hitch wedge 160 helps to secure the hitch bar 112 in the hitch receiver 127 (e.g., trailer hitch receiver 127) of a vehicle 124. For example, after the hitch bar 112 is positioned in the hitch receiver 127, the hitch wedge 160 will be positioned within the hitch receiver 127. A hitch pin 162 can then be placed through apertures in the hitch receiver 127 and apertures 170 (see FIG. 15) in the hitch bar 112. A hitch pin lock 172 can lock the hitch pin 162 in place. A hitch wedge bolt 166 (see FIG. 15) can then be tightened. The tightening of the hitch wedge bolt 166 pulls or tightens the hitch wedge 160 into place, thus locking the entire bicycle carrier 100 to the vehicle hitch mounting point and stopping relative motion between the bicycle carrier 100 and the vehicle 124. This greatly reduces rattling of the bicycle carrier 100 and, by extension, the bicycles 126, during transport. Loosening the hitch wedge bolt 166 loosens the hitch wedge 160, allowing a hitch wedge spring 164 (see FIG. 15) to fully release the hitch wedge 160, thereby allowing the bicycle carrier 100 to be removed from the vehicle 124. FIG. 14 also illustrates an expanded view of the hitch wedge 160.

In one embodiment, as the hitch wedge 160 is tightened, the hitch wedge 160 presses against an interior of the hitch receiver 127 of the vehicle 124, preventing motion of the hitch bar 112 relative to the hitch receiver 127 of the vehicle 124. This effect can be sufficient to secure the bicycle carrier 100 to the vehicle 124 without using the hitch pin 162.

In one embodiment, the hinge assembly 114 also includes a damper pin 155. By pulling the damper pin 155, the dampers 152 are decoupled from the post 102. The damper yoke 154 and the dampers 152 can be rotated downward and the damper pin 155 can be placed in the second damper pin receiver 158. In this configuration, the post 102 can rotate beyond the loading position into the wall mounting or storage position.

Figure 15:
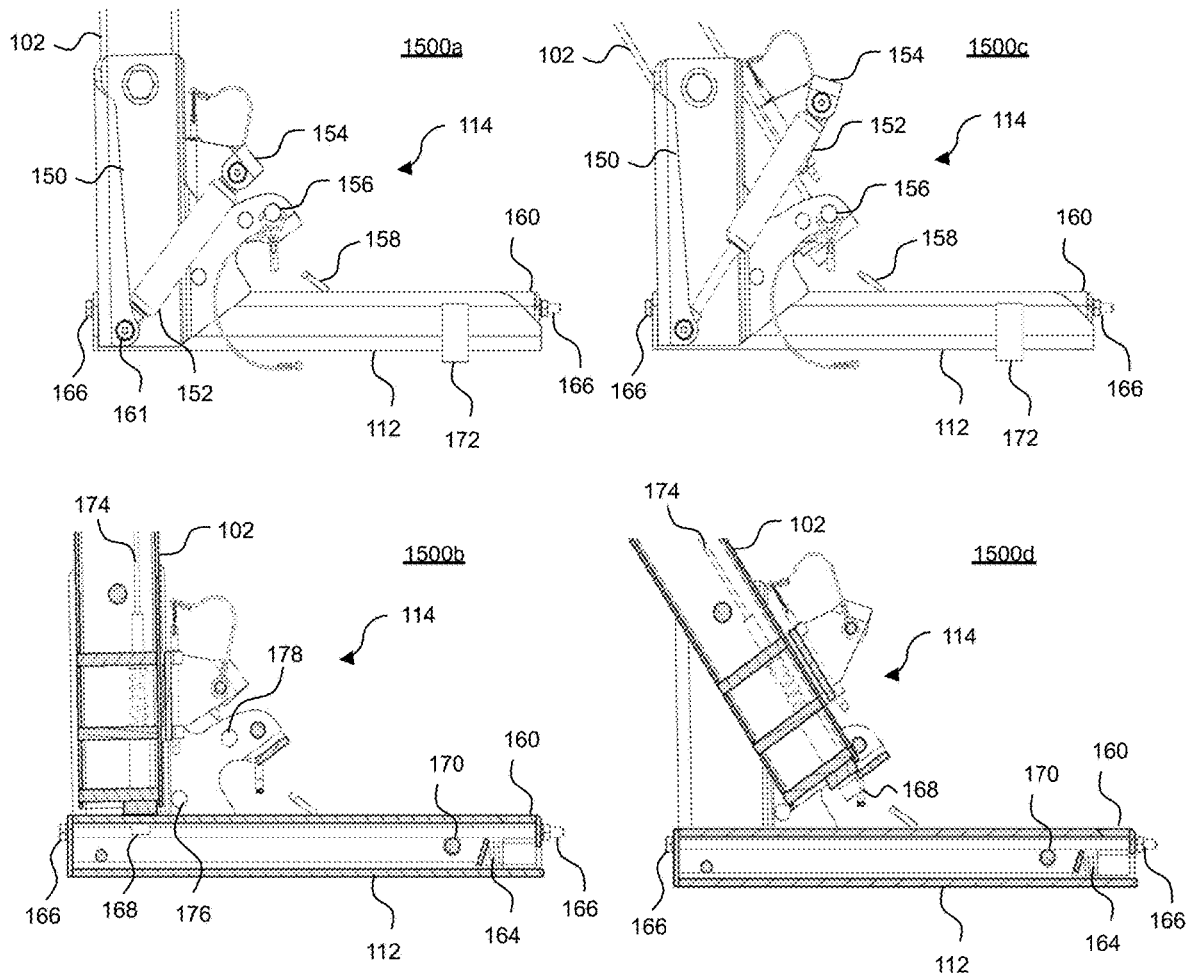
FIG. 15 illustrates four views of a hinge assembly of a bicycle carrier, according to an embodiment.

FIG. 15 illustrates four views 1500a, 1500b, 1500c, 1500d, of a hinge assembly 114 of a bicycle carrier 100, according to an embodiment. View 1500a is a side view of a portion of the hinge assembly 114, the hitch bar 112, and the portion of the post 102 in the transport position. View 1500b is a side sectional view of the hinge assembly 114, the hitch bar 112, and a portion of the post 102 in the transport position. View 1500c is a side view of the hinge assembly 114, the hitch bar 112, and a portion of the post 102 in the loading position. View 1500d is a side sectional view of the hinge assembly 114, the hitch bar 112, and a portion of the post 102 in the loading position.

In view 1500a, the post 102 is in the transport position. The post 102 is substantially perpendicular to the hitch bar 112. The dampers 152 are in a retracted position.

In view 1500b, the post 102 is in the transport position. A release rod 174 extends through the post 102. The release rod 174 can be a release cable. When the release lever 116 is pulled, a locking latch pin 168 is released by action of the release rod 174. This enables rotation of the post 102. The side sectional view of 1500b also illustrates the hitch wedge bolt 166 extending through the hitch bar 112 to the hitch wedge 160. The side sectional view of 1500b also illustrates apertures 170 in the hitch bar 112, through which the hitch pin 162 can be passed.

In view 1500c, the post 102 is in the loading position. The locking latch pin 168 has been released, enabling rotation of the post 102 to the loading position. The loading position is achieved when the post 102 abuts the hinge stop pin 156. The hinge stop pin 156 can be placed in the aperture 178 (see view 1500b) to reduce the rotation angle of the post 102 relative to vertical. If the hinge stop pin 156 is placed in the aperture 176 (see view 1500b), rotation of the post 102 from the transport position is prohibited. This locks the post 102 in the transport position. In the view 1500d, the interior of the post 102 can be seen at the loading position.

Figure 16:
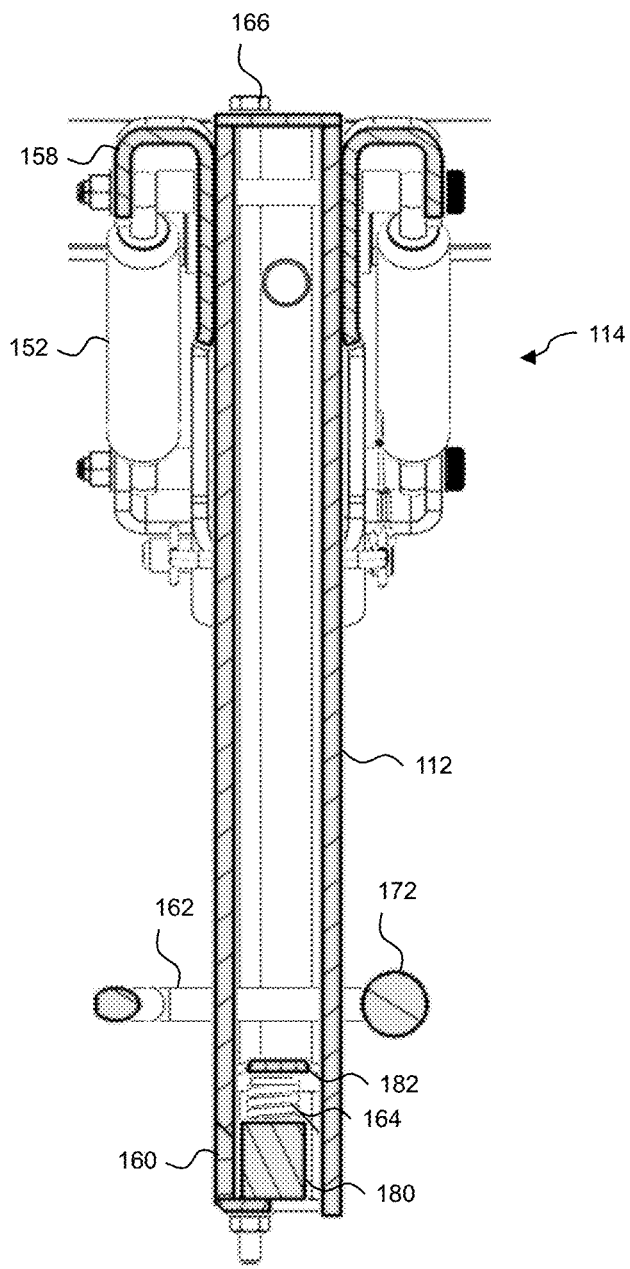
FIG. 16 is a bottom sectional view of the hinge assembly and a hitch bar, according to an embodiment.

FIG. 16 is a bottom sectional view of the hinge assembly 114 and the hitch bar 112, including a wedge 160, according to an embodiment. From the bottom sectional view, a wedge spring bracket 180, the hitch wedge spring 164, and a wedge spring stop 182 are apparent.

In one embodiment, the hitch bar 112 extends full length, greatly simplifying the insertion process because the load of the rack can be fully transferred to the hitch bar 112 as it is inserted into the hitch receiver 127. The hitch bar 112 may be formed with one upper corner and about ¼ of the top wall and side wall abutting the upper corner extending the full length. The wedge 160 is formed to nominally occupy a space sloping away from the one upper corner, such that tightening the hitch wedge bolt 166 causes the wedge to slide along the sloping end of the hitch bar 112 to expand and securely hold the hitch bar in place. The internal spring 164 substantially prevents the wedge 160 from engaging too early in the insertion process, allowing it to be inserted easily. The orientation of the wedge spring bracket 180, wedge spring stop 182 and spring 164 in the wedge 160 also provides pressure on the wedge 160 to hold it in place that keeps it lined up with the hitch bar 112 for easier insertion.

Figure 17:
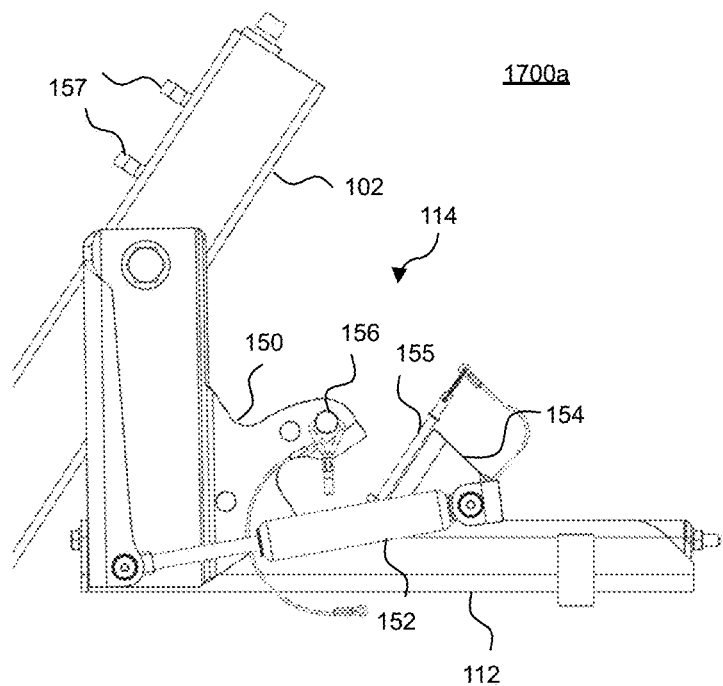
FIG. 17 illustrates two views of a hinge assembly of a bicycle carrier, according to an embodiment.
Figure 17:
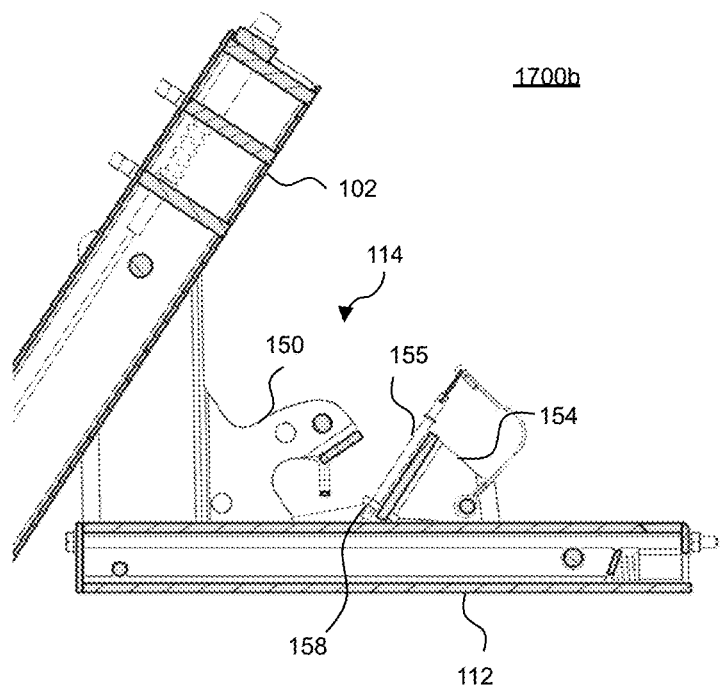

FIG. 17 illustrates two views 1700a and 1700b of a hinge assembly 114 of a bicycle carrier 100, according to an embodiment. View 1700a is a side view of the hinge assembly 114, the hitch bar 112, and a portion of the post 102 in the wall mounting or storage position. View 1700b is a side sectional view of the hinge assembly 114, the hitch bar 112 and a portion of the post 102 in the transport position. To enter into the storage or the mounting position, the damper pin 155 is removed, the damper yoke 154 is removed and lowered to the hitch bar 112 and the damper pin 155 is placed in the second damper pin receiver 158. With the dampers 152 and the damper yoke 154 decoupled from the post 102, and the hinge stop pin 156 removed, the post 102 can rotate beyond the loading position into the storage or wall mounting position. In the storage or wall mounting position, the post 102 is rotated more than 90 degrees from the transport position, for example 150 degrees.

Figure 18:
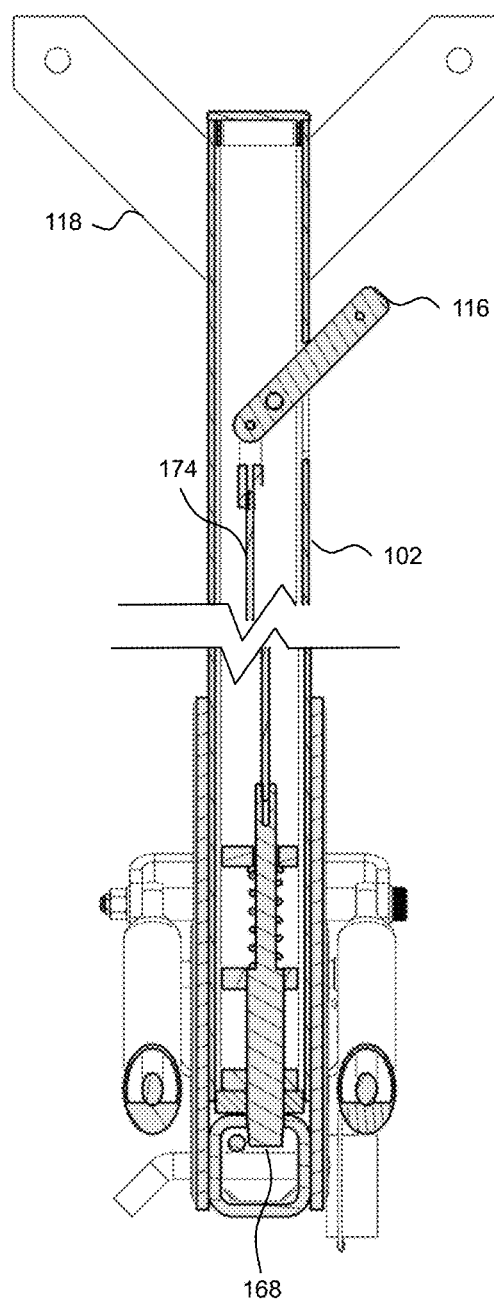
FIG. 18 is a cross section view of a bicycle carrier post showing the lever actuation of the locking latch pin, according to an embodiment.

FIG. 18 is a cross section view of a bicycle carrier post 102 showing the lever actuation of the locking latch pin 168. The rack release lever 116 is moved downward causing the locking latch pin 168 to release the post 102 to rotate to one of the stopping positions, such as the transport position, the loading position, or the mounting or storage position.

Figure 19:
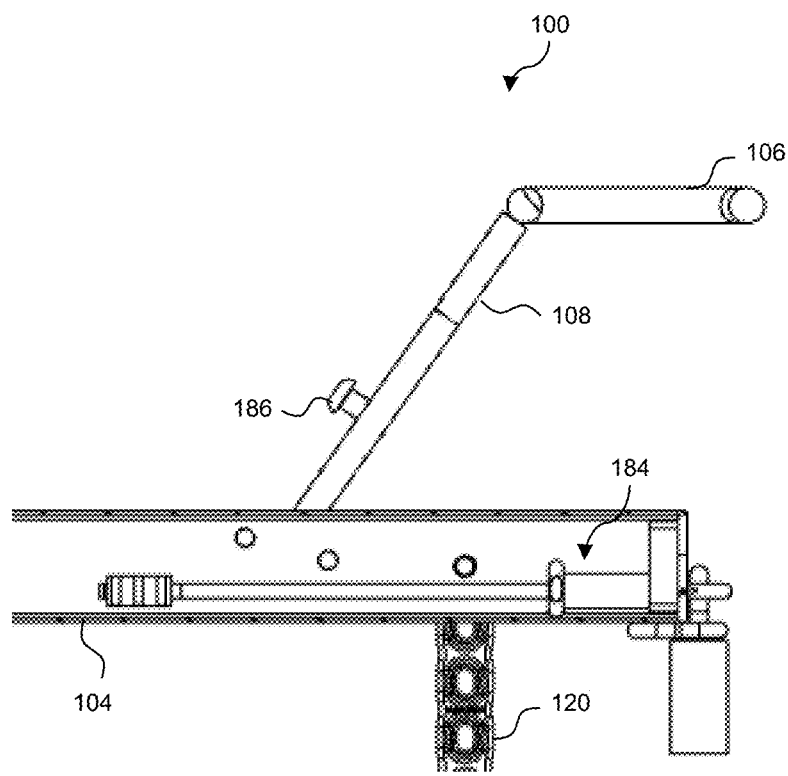
FIG. 19 is a side sectional view of a first horizontal support member of a bicycle carrier showing a stored internal locking cable, according to an embodiment.
Figure 19:
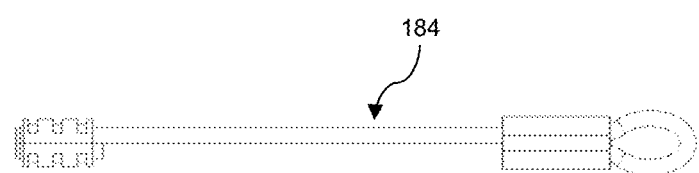

FIG. 19 is a side sectional view of a first horizontal support member 104 of a bicycle carrier 100, according to an embodiment. The view of FIG. 19 illustrates that the first horizontal support member 104 is hollow. An internal locking cable 184 is positioned within the hollow first horizontal support member 104. An end of the first horizontal support member 104 can be opened and the internal locking cable 184 can be drawn out. The internal locking cable 184 can then be used to lock any or all of the bicycles 126 that are carried by the bicycle carrier 100. FIG. 19 also illustrates a strap anchor 186 coupled to the support member 108. The first strap 120 can be looped between the spokes of a front wheel 128 and then latched onto the strap anchor 186.

Figure 20:
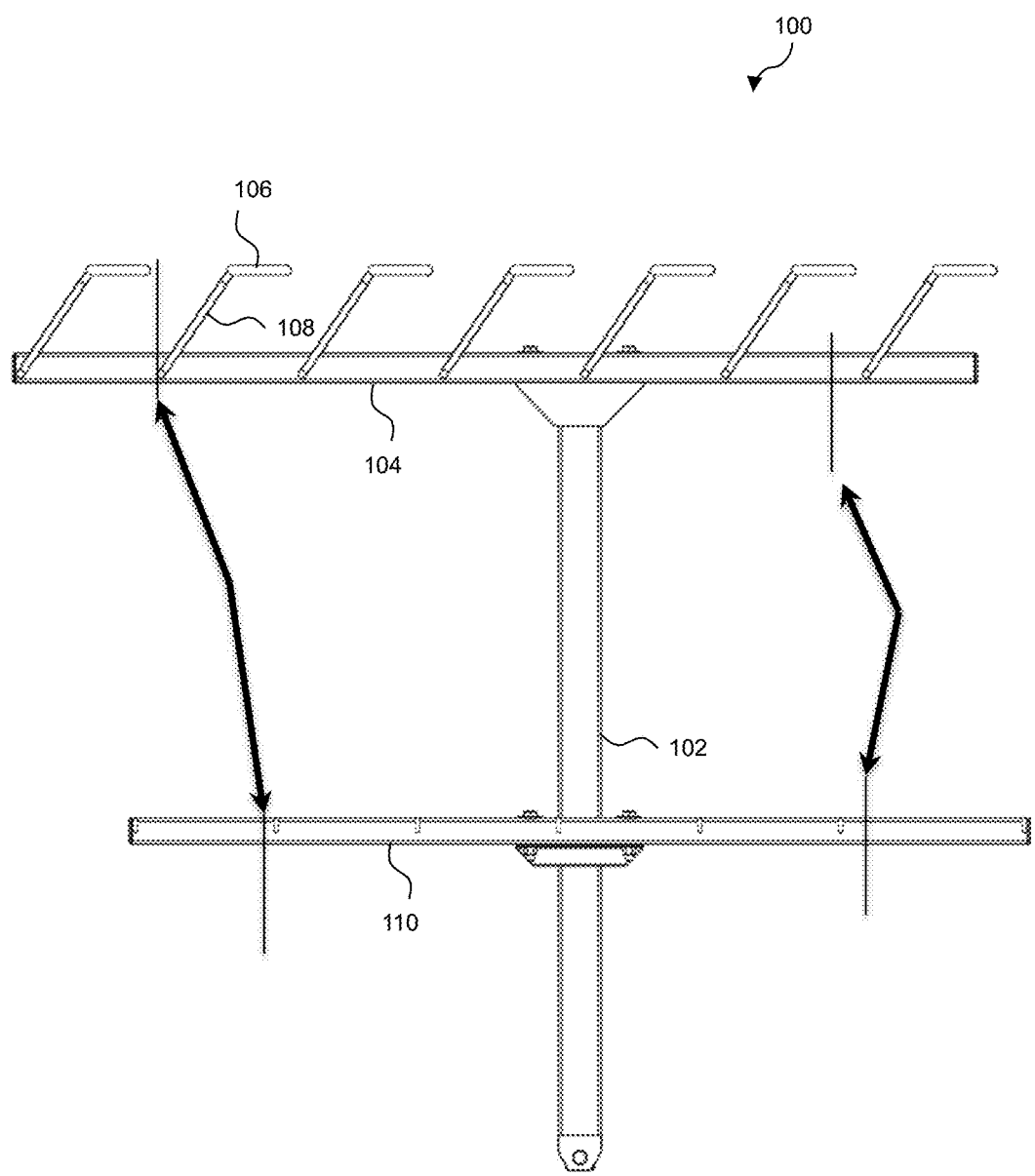
FIG. 20 illustrates a bicycle carrier that can telescope to reduce the number of C-hoops, according to an embodiment.

FIG. 20 illustrates a bicycle carrier 100 that can telescope to reduce the number of C-hoops 106, according to an embodiment. The first and the second horizontal support members 104, 110 can telescope between maximum lengths and minimum lengths. For example, after removing the two C-hoops 106 on either end of the first horizontal support member 104 via removing screws or bolts, portions of the first horizontal support member 104 can be removed from or telescoped into an inferior of the first horizontal support member 104. The second horizontal support member 110 can be removed or telescoped in the same manner. In one example, the bicycle carrier 100 includes a maximum number of seven C-hoops 106. After removal and telescoping, the bicycle carrier 100 includes a minimum of five C-hoops 106. Those of skill in the art will recognize in light of the present disclosure that other maximum or minimum numbers of C-hoops 106 are possible without departing from the scope of the present disclosure.

Figure 21:
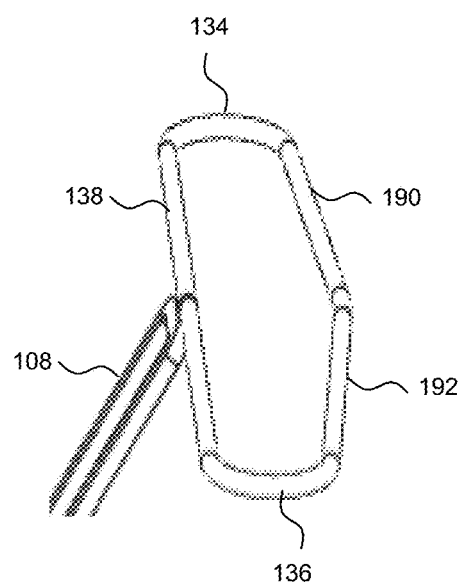
FIG. 21 illustrates a C-hoop and a portion of angled support members, according to an embodiment.

FIG. 21 illustrates a C-hoop 106 and a portion of angled support members 108, in accordance with an embodiment. The C-hoop 106 includes a straight portion 138 coupled to the angled support members 108 extending between a first bend 134 and a second bend 136. The C-hoop 106 includes lengths 190 and 192 extending from the first and the second bends 134 and 136.

The lengths 190 and 192 extend outward. This outward extension helps to ensure that the spokes of a bicycle wheel will not contact the lengths 190 and 192 when the wheel is positioned in the C-hoop 106. The lengths 190 and 192 may connect to each other. Alternatively, the lengths 190, 192 can end in terminations 130, 132 that define a gap 131, as shown in FIGS. 12 and 13. In one embodiment, the lengths 190, 192 extend outward at an angle between 5 degrees and 45 degrees. The C-hoop 106 can include single unitary bar or rod bent in the shape shown in FIG. 21. Alternatively, the C-hoop 106 can include multiple segments connected together.

Figure 22A:
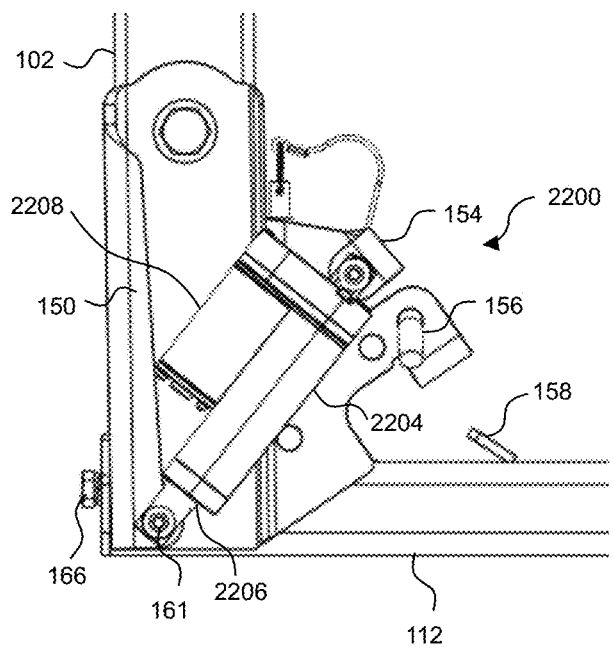
FIG. 22A is a diagram showing a portion of a sports equipment carrier including a force transmission in a raised position, according to an embodiment.
Figure 22B:
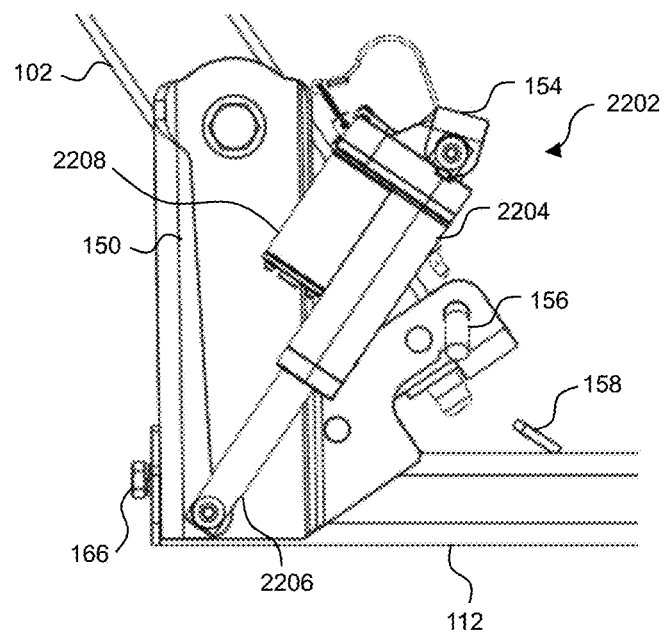
FIG. 22B is a diagram showing a portion of a sports equipment carrier including the force transmission of FIG. 22A in a lowered or partially lowered position, according to an embodiment.

FIG. 22A is a view of a portion of a sports rack 2200 in raised position including damper 2204 configured as a force transmission 2206 with a force member 2208 for providing powered lifting or human assisted lifting capability, according to an embodiment. FIG. 22B is a view of the portion of the sports rack 2200 of FIG. 22A in the lowered position or intermediate position, according to an embodiment.

Referring to FIGS. 22A and 22B, a sports rack 2200 for a vehicle 124 may include a hitch bar 112 configured to mount to a vehicle trailer hitch receiver 127, a hinge assembly 114 operatively coupled to the hitch bar 112, and at least one post 102 having a proximal end and a distal end. The at least one post 102 may be operatively coupled to the hinge assembly 114 at the proximal end, and the at least one post 102 may be rotatable relative to the hitch bar 112 through an arc in a vertical plane defined by the hinge assembly 114 between a lowered position and a raised position. The sports rack 2200 may include an equipment mount 103 operatively coupled to the distal end of the at least one post 102, and a damper 152, 2204 operatively coupled to the at least one post 102 and the hitch bar 112. The damper 152, 2204 may be configured to limit a rate of rotation of the at least one post 102 from the raised position to the lowered position.

Figure 23:
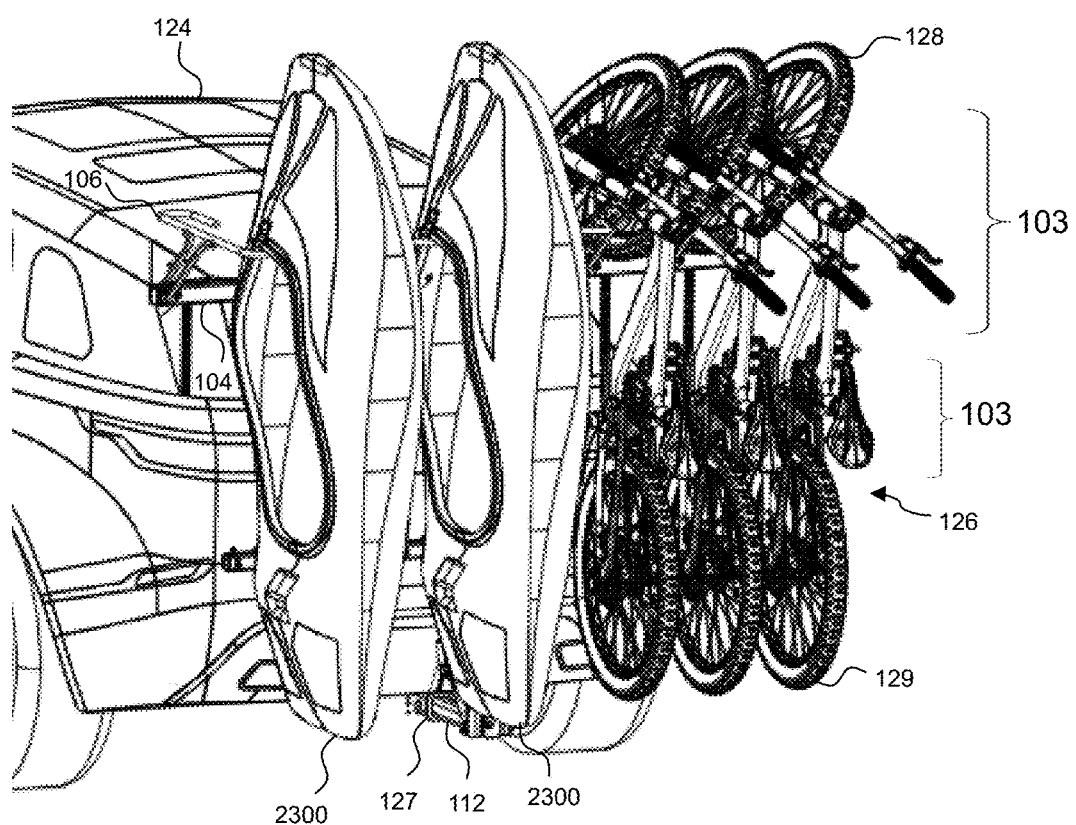
FIG. 23 illustrates a sports equipment carrier configured to carry a combination of bicycles and whitewater kayaks, according to an embodiment.

FIG. 23 is a view of a sports rack 100, 2200 mounted on a vehicle 124, the sports rack 100, 2200 being shown in a raised position, ready for transport, according to an embodiment.

Referring again to FIGS. 22A and 22B, in an embodiment, the damper 152, 2204 is configured to cause the at least one post 102 to rotate from the raised position to the lowered position at a rate slower than a rate of rotation driven by gravity. In an embodiment, the damper 152, 2204 includes a force transmission 2206 configured to cause the at least one post 102 and the equipment mount 103 to rotate from the lowered position to the raised position. In another embodiment, the damper 152, 2204 includes a force transmission 2206 configured to urge the at least one post 102 toward the raised position from the lowered position. The force transmission 2206 may be configured to exert sufficient torque to cause the at least one post 102 to rotate from the lowered position to the raised position without human lifting effort when the equipment mount 103 is empty. The force transmission 2206 may be configured to exert sufficient torque to reduce an amount of human lifting effort required or eliminate the human lifting effort altogether to rotate the at least one post 102 from the lowered position to the raised position when the equipment mount 103 is loaded to an equipment lifting capacity. In an embodiment, the force transmission 2206 includes a force multiplier, such as a gear set, a pulley, a cogged pulley, or a block and tackle, for multiplying a force received from a force member 2208. The force transmission 2206 may include one or more of a lead screw mechanism, a rack and pinion mechanism, or a cogged belt and at least two cogged pulleys. The force transmission 2206 may include a crank for receiving a rotational force from a human user. Alternatively, the force transmission 2206 may include a coupling for receiving a rotational force from a drill or impact driver. In an embodiment, the force transmission 2206 includes a force member 2208 comprising a spring mechanism. In an embodiment, the force transmission 2206 includes a force member 2208 comprising a pneumatic cylinder. The force transmission 2206 may include a force member 2208 comprising a winch. Alternatively, the force transmission 2206 may include a force member 2208 comprising a brushless synchronous electric motor. The force transmission 2206 may include a force member 2208 configured to draw electrical current from a trailer wiring socket (not shown).

In an embodiment, the sports rack 2200 further includes a locking mechanism 168 configured to stabilize the at least one post 102 in the raised position. In an embodiment, the sports rack 2200 further includes a detent mechanism or locking mechanism 168 configured to stabilize the at least one post 102 in the lowered position. At least one post 102 may consist essentially of one post 102. In an embodiment, the at least one post 102 includes a formed post 102 including an off-axis portion disposed to provide a clear field to a vehicle 124 back-up camera (not shown) when the formed post 102 is in the raised position. In another embodiment, the at least one post 102 includes a formed post 102 including an off-axis portion disposed to provide for user access to a vehicle 124 rear hatch control (not shown) when the formed post 102 is in the raised position. Alternatively, the at least one post 102 may include two or more posts 102, the two or more posts 102 disposed lateral to a centerline of the hitch bar 112.

In an embodiment, the equipment mount 103 includes a bicycle rack 100 configured to continuously hold one or more bicycles 126a, 126b while the at least one post 102 is rotated from the lowered position to the raised position to support the one or more bicycles 126a, 126b on the vehicle 124 above ground. The bicycle rack 100 may include a C-hoop 106 coupled to the first support member 104 and having a shape like a letter C.

Referring to FIG. 23, the equipment mount 103 may include a kayak rack configured to hold one or more respective kayaks 2300. The equipment mount 103 may include a slot (not shown) configured to receive one or more kayak 2300 T-handles (not shown) disposed near a bow and/or stem (not shown) of respective kayaks 2300. In an embodiment, the equipment mount 103 includes a mount 106 (such as a C-hoop, as shown) configured to hold either a bicycle wheel 128 or to hook a cockpit of a kayaks 2300. In an embodiment, the one or more kayaks 2300 include whitewater kayaks 2300. The one or more kayaks 2300 may be supported in a substantially vertical orientation when the at least one post 102 is in the raised position.

In an embodiment, the bicycle carrier 100 may include integrated locking cables as an anti-theft deterrent when riders are not with the bicycles 126 and bicycle carrier 100.

Referring to FIGS. 22-23, the sports rack 100, 2200 may further include a wall mount bar (see, e.g., wall mount structure 144 of FIG. 9A) configured to be screwed to a wall (see, e.g., wall 145 of FIG. 9A), and one or more wall mount fittings (see, e.g., wall mount fittings 149 of FIG. 9B) configured to be coupled to the wall mount bar and configured to receive and hold a feature of the equipment mount 103. In an embodiment, the sports rack 100, 2200 further includes a cable lock loop (see, e.g., cable lock loop 115 of FIG. 1) coupled to the post 102 or equipment mount 103. The cable lock loop may be configured to receive one or more locking cables or chains for securing sports equipment to the sports rack 100, 2200.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A bicycle carrier, comprising:
a post;
a first support member coupled to the post and spanning a first length substantially perpendicular to the post;
a C-hoop coupled to the first support member, the C-hoop being configured to receive a wheel of a bicycle such that the bicycle is suspended vertically when the wheel is placed in the C-hoop; and
a coupling member between the C-hoop and the first support member configured to permit the C-hoop to receive the wheel at any of a range of angles with respect to the post, the range of angles including at least an angle substantially parallel to the post and an acute angle with respect to the post;
wherein the coupling member between the C-hoop and the first support member is an angled coupling member that extends from only one side of the C-hoop to the first support member at an angle greater than 20 degrees from vertical when the post is vertical.

2. The bicycle carrier of claim 1, wherein the C-hoop defines the plane substantially perpendicular to the post.

3. The bicycle carrier of claim 1, further comprising a securing strap, wherein the securing strap secures the wheel to the first support member, and
the securing strap and the C-hoop hold the wheel at an angle greater than 20 degrees with respect to the post when the bicycle carrier is in a carrying or storage state.

4. The bicycle carrier of claim 1, wherein the C-hoop and the first support member are positioned so that a tire of the bicycle contacts the first support member when the wheel is positioned in the C-hoop.

5. The bicycle carrier of claim 1, further comprising a second C-hoop coupled to the first support member and having a shape like a letter C.

6. The bicycle carrier of claim 1, wherein the C-hoop includes:
a first termination; and
a second termination, the first and the second terminations being bar ends and defining a gap between the first and the second terminations.

7. The bicycle carrier of claim 6, wherein the first termination and the second termination are positioned so that spokes of the wheel are not contacted by the C-hoop.

8. The bicycle carrier of claim 1, further comprising a hitch bar configured to be received in a trailer hitch receiver of a vehicle.

9. The bicycle carrier of claim 8, further comprising a hinge assembly coupling the hitch bar to the post, wherein the hinge assembly holds the post substantially perpendicular to the hitch bar in a transport position, and wherein the post extends substantially vertically in the transport position.

10. The bicycle carrier of claim 1, wherein the hinge assembly enables the post to rotate more than 90 degrees from the transport position.

11. The bicycle carrier of claim 1, further comprising a second support member coupled to the post and spanning a second length substantially perpendicular to the post, the second support member configured to contact a second wheel of the bicycle when the bicycle is suspended via the C-hoop.

12. A bicycle carrier, comprising:
a post;
a first horizontal support member coupled to the post and spanning a length substantially perpendicular to the post; and
one or more C-hoops for receiving a wheel of a bicycle, wherein the one or more C-hoops are each coupled to the first horizontal support member via at least two respective angled support members fixed to only one side of the C-hoop.

13. The bicycle carrier of claim 12, further comprising:
a hitch bar configured to couple to a trailer hitch receiver of a vehicle, wherein
the post is coupled to the hitch bar;
a plurality of the C-hoops, and
each C-hoop includes:
a first termination; and
a second termination, the first and the second terminations defining a gap between the first and the second terminations.

14. The bicycle carrier of claim 13, wherein each C-hoop includes a bar configured in a shape of a C, the first and the second terminations being ends of the bar.

15. The bicycle carrier of claim 14, wherein the bar includes:
a first bend that bends more than 90 degrees; and
a second bend that bends more than 90 degrees.

16. The bicycle carrier of claim 15, wherein the bar includes a straight portion extending between the first and the second bends, the straight portion bearing the angled support member.

17. The bicycle carrier of claim 15, wherein the bar defines a plane substantially perpendicular to the post.

18. The bicycle carrier of claim 15, wherein,
at least one of the first bend and the second bend is configured to receive within its bend a bicycle seat post and thereby suspend a bicycle by a seat of the bicycle.

* * * * *